(12) United States Patent
Liang et al.

(10) Patent No.: US 11,953,926 B2
(45) Date of Patent: Apr. 9, 2024

(54) VOLTAGE REGULATION SCHEMES FOR POWERING MULTIPLE CIRCUIT BLOCKS

(71) Applicant: Skyworks Solutions, Inc., Irvine, CA (US)

(72) Inventors: Bang Li Liang, Ottawa (CA); Guillaume Alexandre Blin, Carlisle, MA (US); Thomas Obkircher, Santa Ana, CA (US)

(73) Assignee: Skyworks Solutions, Inc., Irvine, CA (US)

(*) Notice: Subject to any disclaimer, the term of this patent is extended or adjusted under 35 U.S.C. 154(b) by 23 days.

(21) Appl. No.: 17/807,316

(22) Filed: Jun. 16, 2022

(65) Prior Publication Data
US 2022/0413534 A1 Dec. 29, 2022

Related U.S. Application Data

(60) Provisional application No. 63/202,887, filed on Jun. 29, 2021, provisional application No. 63/202,889, filed on Jun. 29, 2021.

(51) Int. Cl.
| | |
|---|---|
| *G05F 1/575* | (2006.01) |
| *G05F 1/46* | (2006.01) |
| *G05F 1/577* | (2006.01) |
| *H04B 1/40* | (2015.01) |

(52) U.S. Cl.
CPC .............. *G05F 1/577* (2013.01); *G05F 1/468* (2013.01); *G05F 1/575* (2013.01); *H04B 1/40* (2013.01)

(58) Field of Classification Search
CPC .......... G05F 1/462; G05F 1/465; G05F 1/468; G05F 1/56; G05F 1/575; G05F 1/562; G05F 1/565; G05F 1/567; G05F 1/569; G05F 1/571; G05F 1/573; G05F 1/5735
See application file for complete search history.

(56) References Cited

U.S. PATENT DOCUMENTS

| | | | |
|---|---|---|---|
| 6,674,646 B1 | 1/2004 | Golshan et al. | |
| 7,058,374 B2 | 6/2006 | Levesque et al. | |
| 7,095,257 B2 | 8/2006 | Whittaker | |
| 7,421,256 B2 | 9/2008 | Levesque et al. | |
| 7,499,682 B2 | 3/2009 | Rozenblit et al. | |
| 7,554,306 B2 | 6/2009 | Lee et al. | |
| 7,619,402 B1* | 11/2009 | Kwong | G05F 1/575 323/369 |
| 7,764,055 B2 | 7/2010 | Rozenblit et al. | |
| 7,898,230 B2 | 3/2011 | Lee et al. | |

(Continued)

Primary Examiner — Thienvu V Tran
Assistant Examiner — Nusrat Quddus
(74) Attorney, Agent, or Firm — Knobbe, Martens, Olson & Bear, LLP

(57) ABSTRACT

Voltage regulation schemes for powering multiple circuit blocks are disclosed. In certain embodiments, a front end system includes a reference voltage circuit that receives power from a power supply voltage and generates a reference voltage, a group of circuit blocks each selectively enabled by a corresponding one of a group of enable signals, and a programmable voltage regulator that generates a programmable regulated voltage based on the reference voltage and provides the programmable regulated voltage to the circuit blocks. The programmable regulated voltage has a voltage level that changes based on a selection of the circuit blocks that are enabled by the enable signals.

20 Claims, 16 Drawing Sheets

(56) References Cited

U.S. PATENT DOCUMENTS

| | | |
|---|---|---|
| 8,064,179 B2 | 11/2011 | Apfel |
| 8,774,739 B2 | 7/2014 | Ripley et al. |
| 8,861,229 B2 | 10/2014 | Alfano et al. |
| 9,537,581 B2 | 1/2017 | Mills et al. |
| 9,588,529 B2 | 3/2017 | Balteanu et al. |
| 9,705,554 B2 | 7/2017 | Li et al. |
| 9,801,242 B2 | 10/2017 | Hariman et al. |
| 9,971,377 B2 | 5/2018 | Balteanu et al. |
| 9,973,088 B2 | 5/2018 | Balteanu et al. |
| 10,038,373 B2 | 7/2018 | Brown |
| 10,044,397 B2 | 8/2018 | Li et al. |
| 10,069,492 B2 | 9/2018 | Ho |
| 10,156,860 B2 | 12/2018 | Zhou |
| 10,170,989 B2 | 1/2019 | Balteanu et al. |
| 10,177,838 B2 | 1/2019 | Ripley et al. |
| 10,182,476 B2 | 1/2019 | Hariman et al. |
| 10,224,876 B2 | 3/2019 | Gorbachov et al. |
| 10,326,443 B2 | 6/2019 | Ho |
| 10,505,446 B2 | 12/2019 | Brown |
| 10,512,129 B2 | 12/2019 | Hariman et al. |
| 10,554,294 B2 | 2/2020 | Ripley et al. |
| 11,018,580 B2 | 5/2021 | Brown |
| 11,073,854 B2 | 7/2021 | Zhou |
| 2007/0159145 A1 | 7/2007 | Liwinski |
| 2008/0265854 A1* | 10/2008 | Lee .................. G05F 1/575 323/280 |
| 2011/0298435 A1* | 12/2011 | Homol ............... H03F 1/34 323/282 |
| 2016/0098050 A1* | 4/2016 | Enjalbert ........... G05F 1/575 323/280 |
| 2016/0252917 A1* | 9/2016 | Couglar ............. H03F 3/217 323/281 |
| 2016/0380632 A1* | 12/2016 | Crandall ............ H03K 3/02 327/333 |
| 2017/0170822 A1* | 6/2017 | Cook ................. H04W 52/52 |
| 2019/0229682 A1 | 7/2019 | Gorbachov et al. |
| 2022/0004213 A1 | 1/2022 | Zhou |
| 2022/0014152 A1* | 1/2022 | Gebeyehu .......... H03F 3/245 |
| 2022/0187861 A1 | 6/2022 | Zsolczai et al. |
| 2022/0187862 A1 | 6/2022 | Onódy et al. |
| 2022/0278707 A1* | 9/2022 | Liang ................. H03F 3/68 |
| 2022/0413533 A1 | 12/2022 | Liang et al. |
| 2023/0100609 A1* | 3/2023 | Liang ................. G06F 1/26 713/320 |
| 2023/0114964 A1* | 4/2023 | Blin .................. H03F 1/0261 327/526 |

\* cited by examiner

VOLTAGE REGULATION SCHEMES FOR POWERING MULTIPLE CIRCUIT BLOCKS

CROSS-REFERENCE TO RELATED APPLICATIONS

This application claims the benefit of priority under 35 U.S.C. § 119 of U.S. Provisional Patent Application No. 63/202,889, filed Jun. 29, 2021 and titled "VOLTAGE REGULATION SCHEMES FOR POWERING MULTIPLE CIRCUIT BLOCKS," and of Provisional Patent Application No. 63/202,887, filed Jun. 29, 2021 and titled "PROGRAMMABLE VOLTAGE REGULATORS FOR POWERING MULTIPLE CIRCUIT BLOCKS," each of which is herein incorporated by reference in its entirety.

BACKGROUND

Field

Embodiments of the invention relate to electronic systems, and in particular, to radio frequency (RF) electronics.

Description of the Related Technology

Radio frequency (RF) communication systems include, but are not limited to mobile phones, tablets, base stations, network access points, laptops, and wearable electronics.

RF communication systems wirelessly communicate using RF signals, which can have a frequency in the range from about 30 kHz to 300 GHz, for instance, in the range of about 400 MHz to about 7.125 GHz for Frequency Range 1 (FR1) of the Fifth Generation (5G) communication standard or in the range of about 24.250 GHz to about 71.000 GHz for Frequency Range 2 (FR2) of the 5G communication standard.

SUMMARY

In certain embodiments, the present disclosure relates to a front end system. The front end system includes a reference voltage circuit configured to receive power from a power supply voltage and to generate a reference voltage, a plurality of circuit blocks each selectively enabled by a corresponding one of a plurality of enable signals, and a programmable voltage regulator configured to generate a programmable regulated voltage based on the reference voltage and to provide the programmable regulated voltage to the plurality of circuit blocks. The programmable regulated voltage has a voltage level that changes based on a selection of the circuit blocks that are enabled by the plurality of enable signals.

In various embodiments, the plurality of circuit blocks include a fuse circuit, a radio frequency circuit, and a digital circuit. According to a number of embodiments, the programmable voltage level operates at a high voltage level when the fuse circuit is enabled. In accordance with several embodiments, the programmable voltage level operates at a low voltage level when the digital circuit is enabled and the fuse circuit and the radio frequency circuit are disabled. According to some embodiments, the programmable voltage level operates at a medium voltage level when the radio frequency circuit is enabled and the fuse circuit is disabled.

In several embodiments, the plurality of circuit blocks include a digital circuit that generates the plurality of enable signals and that controls the voltage level of the programmable regulated voltage. According to a number of embodiments, the digital circuit generates the plurality of enable signals based on data received over an interface.

In various embodiments, the programmable voltage regulator is configured to receive power from the power supply voltage. According to a number of embodiments, the power supply voltage is operable at two or more voltage levels associated with two or more power supply domains.

In some embodiments, the programmable voltage regulator is a programmable low dropout regulator.

In several embodiments, the reference voltage circuit is a bandgap reference circuit.

In various embodiments, the front end system is implemented on a semiconductor die.

In certain embodiments, the present disclosure relates to a method of voltage regulation in a front end system. The method includes generating a reference voltage using a reference voltage circuit that is powered by a power supply voltage, selectively enabling a plurality of circuit blocks using a plurality of enable signals each corresponding to one of the plurality of circuit blocks, generating a programmable regulated voltage based on the reference voltage using a programmable voltage regulator, providing the programmable regulated voltage to the plurality of circuit blocks, and setting a voltage level of the programmable regulated voltage based on a selection of the circuit blocks that are enabled.

In various embodiments, the plurality of circuit blocks include a fuse circuit, a radio frequency circuit, and a digital circuit, the method further comprising setting the programmable voltage level to a high voltage level when the fuse circuit is enabled. According to a number of embodiments, the method further includes setting the programmable voltage level to a low voltage level when the digital circuit is enabled and the fuse circuit and the radio frequency circuit are disabled. In accordance with several embodiments, the method further includes setting the programmable voltage level to a medium voltage level when the radio frequency circuit is enabled and the fuse circuit is disabled.

In certain embodiments, the present disclosure relates to a mobile device. The mobile device includes a power management system configured to generate a power supply voltage, and a front end system. The front end system includes a reference voltage circuit configured to receive power from the power supply voltage and to generate a reference voltage, a plurality of circuit blocks each selectively enabled by a corresponding one of a plurality of enable signals, and a programmable voltage regulator configured to generate a programmable regulated voltage based on the reference voltage and to provide the programmable regulated voltage to the plurality of circuit blocks. The programmable regulated voltage has a voltage level that changes based on a selection of the circuit blocks that are enabled by the plurality of enable signals.

In several embodiments, the mobile device further includes a transceiver configured to generate a radio frequency signal, the plurality of circuit blocks including a radio frequency circuit configured to process the radio frequency signal, and a fuse circuit.

In various embodiments, the programmable voltage level operates at a first voltage level when the fuse circuit is enabled, and a second voltage level less than that first voltage level when the radio frequency circuit is enabled and the fuse circuit is disabled. According to a number of embodiments, the plurality of circuit blocks further include a digital circuit, the programmable voltage level operating at a third voltage level when the digital circuit is enabled and the fuse circuit and the radio frequency circuit are disabled, the third voltage level less than the first voltage level and the second voltage level.

In several embodiments, the programmable voltage regulator is a programmable low dropout regulator.

In certain embodiments, the present disclosure relates to a front end system. The front end system includes a plurality of circuit blocks, and a programmable low dropout regulator configured to generate a programmable regulated voltage for the plurality of circuit blocks based on a first multi-bit control signal. The programmable low dropout regulator includes a controllable frequency compensation circuit controlled by a second multi-bit control signal and operable to control a phase margin of the programmable low dropout regulator, and an overshoot control circuit controlled by a third multi-bit control signal and operable to control an overshoot of the programmable regulated voltage.

In various embodiments, the plurality of circuit blocks include a fuse circuit, a radio frequency circuit, and a digital circuit. According to a number of embodiments, the programmable voltage level changes based on which of the plurality of circuit blocks are enabled.

In several embodiments, the programmable low dropout regulator includes a regulation transistor, a regulating amplifier configured to control a gate of the regulation transistor, and a voltage divider coupled to a drain of the regulation transistor and operable to provide a feedback voltage to an input of the regulating amplifier. According to a number of embodiments, the first multi-bit control signal is further configured to control a drive strength of the regulation transistor. In accordance with various embodiments, the first multi-bit control signal is further configured to control a resistance of the voltage divider. According to some embodiments, the controllable frequency compensation circuit is connected between the gate and the drain of the regulation transistor. In accordance with a number of embodiments, the overshoot control circuit is connected between the drain of the regulation transistor and the programmable regulated voltage.

In some embodiments, the programmable low dropout regulator includes a regulation transistor having a source connected to a power supply voltage, the overshoot control circuit connected between a drain of the regulation transistor and the programmable regulated voltage. According to a number of embodiments, the overshoot control circuit includes an overshoot control transistor connected between the drain of the regulation transistor and the programmable regulated voltage, the third multi-bit control signal operable to control a resistance between the power supply voltage and a gate of the overshoot control transistor. In accordance with several embodiments, the front end system further includes an output capacitor and a resistance adjustment circuit connected between the output capacitor and the programmable regulated voltage, the resistance adjustment circuit having a resistance controlled by the third multi-bit control signal. According to various embodiments, the front end system further includes a discharge control circuit connected between the output capacitor and the power supply voltage.

In certain embodiments, the present disclosure relates to a method of voltage regulation in a front end system. The method includes generating a programmable regulated voltage for a plurality of circuit blocks using a programmable low dropout regulator, controlling a voltage level of the programmable regulated voltage using a first multi-bit control signal, controlling a phase margin of the programmable low dropout regulator by controlling a frequency compensation circuit of the programmable low dropout regulator using a second multi-bit control signal, and controlling an overshoot of the programmable regulated voltage by controlling an overshoot control circuit of the programmable low dropout regulator using a third multi-bit control signal.

In various embodiments, the plurality of circuit blocks include a fuse circuit, a radio frequency circuit, and a digital circuit, and the method further includes setting the programmable voltage level based on which of the plurality of circuit blocks are enabled.

In certain embodiments, the present disclosure relates to a mobile device. The mobile device includes a power management system configured to generate a power supply voltage, and a front end system. The front end system includes a programmable low dropout regulator powered by the power supply voltage and configured to generate a programmable regulated voltage based on a first multi-bit control signal, and a plurality of circuit blocks configured to receive the programmable regulated voltage from the programmable low dropout regulator. The programmable low dropout regulator includes a controllable frequency compensation circuit controlled by a second multi-bit control signal and operable to control a phase margin of the programmable low dropout regulator, and an overshoot control circuit controlled by a third multi-bit control signal and operable to control an overshoot of the programmable regulated voltage.

In some embodiments, the mobile device further includes a transceiver configured to generate a radio frequency signal, the plurality of circuit blocks including a radio frequency circuit configured to process the radio frequency signal, and a fuse circuit. According to a number of embodiments, the programmable voltage level changes based on which of the plurality of circuit blocks are enabled.

In various embodiments, the programmable low dropout regulator includes a regulation transistor, a regulating amplifier configured to control a gate of the regulation transistor, and a voltage divider coupled to a drain of the regulation transistor and operable to provide a feedback voltage to an input of the regulating amplifier. According to a number of embodiments, the first multi-bit control signal is further configured to control a drive strength of the regulation transistor. In accordance with several embodiments, the first multi-bit control signal is further configured to control a resistance of the voltage divider. According to some embodiments, the controllable frequency compensation circuit is connected between the gate and the drain of the regulation transistor. In accordance with a number of embodiments, the overshoot control circuit is connected between the drain of the regulation transistor and the programmable regulated voltage.

In some embodiments, the programmable low dropout regulator includes a regulation transistor having a source connected to a power supply voltage, the overshoot control circuit connected between a drain of the regulation transistor and the programmable regulated voltage. According to a number of embodiments, the overshoot control circuit includes an overshoot control transistor connected between the drain of the regulation transistor and the programmable regulated voltage, the third multi-bit control signal operable to control a resistance between the power supply voltage and a gate of the overshoot control transistor. In accordance with several embodiments, the mobile device further includes an output capacitor and a resistance adjustment circuit connected between the output capacitor and the programmable regulated voltage, the resistance adjustment circuit having a resistance controlled by the third multi-bit control signal.

BRIEF DESCRIPTION OF THE DRAWINGS

Embodiments of this disclosure will now be described, by way of non-limiting example, with reference to the accompanying drawings.

DETAILED DESCRIPTION OF CERTAIN EMBODIMENTS

Figure 1:
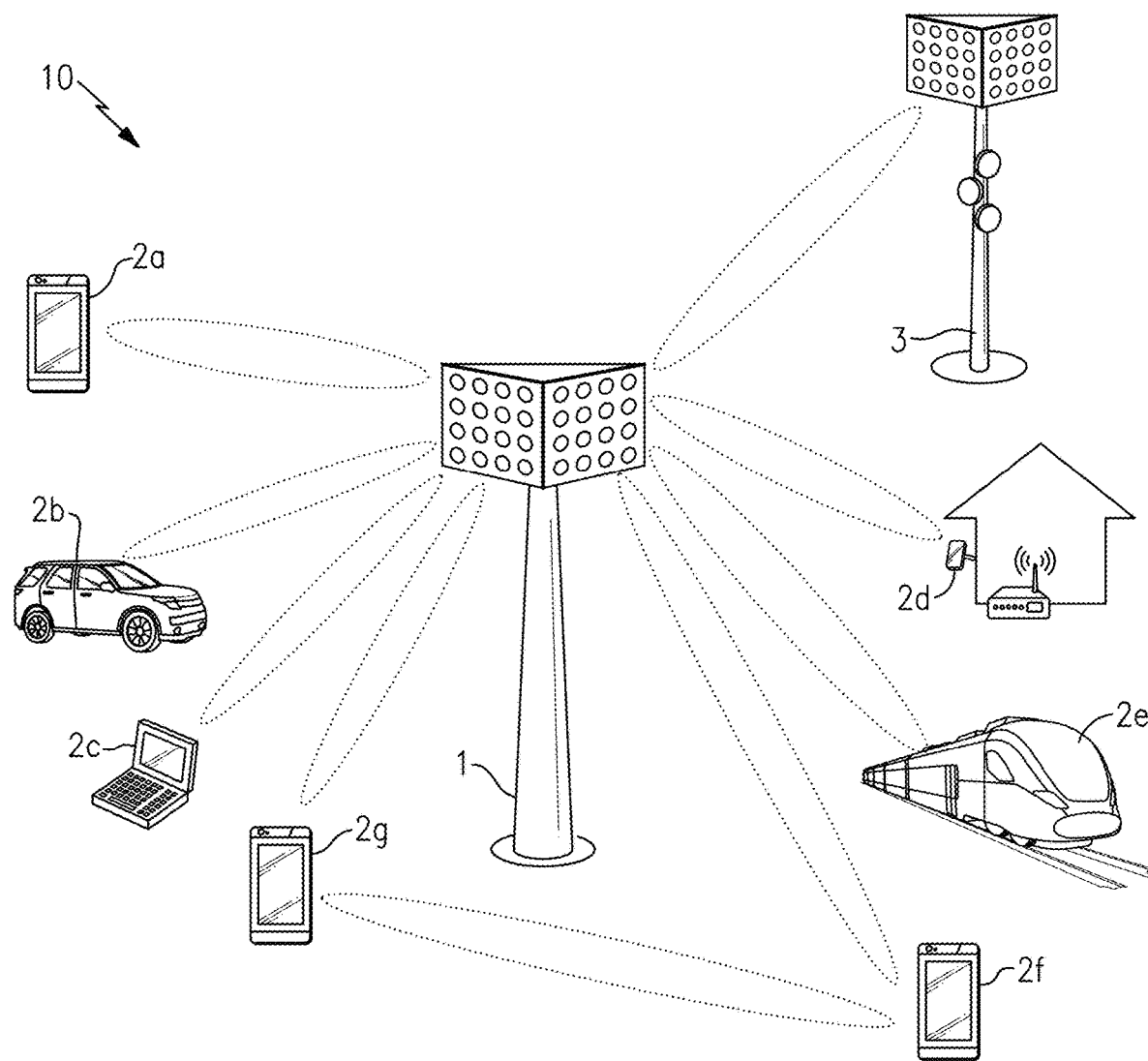
FIG. 1 is a schematic diagram of one example of a communication network.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The International Telecommunication Union (ITU) is a specialized agency of the United Nations (UN) responsible for global issues concerning information and communication technologies, including the shared global use of radio spectrum.

The 3rd Generation Partnership Project (3GPP) is a collaboration between groups of telecommunications standard bodies across the world, such as the Association of Radio Industries and Businesses (ARIB), the Telecommunications Technology Committee (TTC), the China Communications Standards Association (CCSA), the Alliance for Telecommunications Industry Solutions (ATIS), the Telecommunications Technology Association (TTA), the European Telecommunications Standards Institute (ETSI), and the Telecommunications Standards Development Society, India (TSDSI).

Working within the scope of the ITU, 3GPP develops and maintains technical specifications for a variety of mobile communication technologies, including, for example, second generation (2G) technology (for instance, Global System for Mobile Communications (GSM) and Enhanced Data Rates for GSM Evolution (EDGE)), third generation (3G) technology (for instance, Universal Mobile Telecommunications System (UMTS) and High Speed Packet Access (HSPA)), and fourth generation (4G) technology (for instance, Long Term Evolution (LTE) and LTE-Advanced).

The technical specifications controlled by 3GPP can be expanded and revised by specification releases, which can span multiple years and specify a breadth of new features and evolutions.

In one example, 3GPP introduced carrier aggregation (CA) for LTE in Release 10. Although initially introduced with two downlink carriers, 3GPP expanded carrier aggregation in Release 14 to include up to five downlink carriers and up to three uplink carriers. Other examples of new features and evolutions provided by 3GPP releases include, but are not limited to, License Assisted Access (LAA), enhanced LAA (eLAA), Narrowband Internet of things (NB-IOT), Vehicle-to-Everything (V2X), and High Power User Equipment (HPUE).

3GPP introduced Phase 1 of fifth generation (5G) technology in Release 15, and introduced Phase 2 of 5G technology in Release 16. Subsequent 3GPP releases will further evolve and expand 5G technology. 5G technology is also referred to herein as 5G New Radio (NR).

5G NR supports or plans to support a variety of features, such as communications over millimeter wave spectrum, beamforming capability, high spectral efficiency waveforms, low latency communications, multiple radio numerology, and/or non-orthogonal multiple access (NOMA). Although such RF functionalities offer flexibility to networks and enhance user data rates, supporting such features can pose a number of technical challenges.

The teachings herein are applicable to a wide variety of communication systems, including, but not limited to, communication systems using advanced cellular technologies, such as LTE-Advanced, LTE-Advanced Pro, and/or 5G NR.

FIG. 1 is a schematic diagram of one example of a communication network 10. The communication network 10 includes a macro cell base station 1, a small cell base station 3, and various examples of user equipment (UE), including a first mobile device 2a, a wireless-connected car 2b, a laptop 2c, a stationary wireless device 2d, a wireless-connected train 2e, a second mobile device 2f, and a third mobile device 2g.

Although specific examples of base stations and user equipment are illustrated in FIG. 1, a communication network can include base stations and user equipment of a wide variety of types and/or numbers.

For instance, in the example shown, the communication network 10 includes the macro cell base station 1 and the small cell base station 3. The small cell base station 3 can operate with relatively lower power, shorter range, and/or with fewer concurrent users relative to the macro cell base station 1. The small cell base station 3 can also be referred to as a femtocell, a picocell, or a microcell. Although the communication network 10 is illustrated as including two base stations, the communication network 10 can be implemented to include more or fewer base stations and/or base stations of other types.

Although various examples of user equipment are shown, the teachings herein are applicable to a wide variety of user equipment, including, but not limited to, mobile phones, tablets, laptops, IoT devices, wearable electronics, customer premises equipment (CPE), wireless-connected vehicles, wireless relays, and/or a wide variety of other communication devices. Furthermore, user equipment includes not only currently available communication devices that operate in a cellular network, but also subsequently developed communication devices that will be readily implementable with the inventive systems, processes, methods, and devices as described and claimed herein.

The illustrated communication network 10 of FIG. 1 supports communications using a variety of cellular technologies, including, for example, 4G LTE and 5G NR. In certain implementations, the communication network 10 is further adapted to provide a wireless local area network (WLAN), such as WiFi. Although various examples of communication technologies have been provided, the communication network 10 can be adapted to support a wide variety of communication technologies.

Various communication links of the communication network 10 have been depicted in FIG. 1. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

In certain implementations, user equipment can communicate with a base station using one or more of 4G LTE, 5G NR, and WiFi technologies. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed WiFi frequencies).

As shown in FIG. 1, the communication links include not only communication links between UE and base stations, but also UE to UE communications and base station to base station communications. For example, the communication network 10 can be implemented to support self-fronthaul and/or self-backhaul (for instance, as between mobile device 2g and mobile device 2f).

The communication links can operate over a wide variety of frequencies. In certain implementations, communications are supported using 5G NR technology over one or more frequency bands that are less than 6 Gigahertz (GHz) and/or over one or more frequency bands that are greater than 6 GHz. For example, the communication links can serve Frequency Range 1 (FR1), Frequency Range 2 (FR2), or a combination thereof. In one embodiment, one or more of the mobile devices support a HPUE power class specification.

In certain implementations, a base station and/or user equipment communicates using beamforming. For example, beamforming can be used to focus signal strength to overcome path losses, such as high loss associated with communicating over high signal frequencies. In certain embodiments, user equipment, such as one or more mobile phones, communicate using beamforming on millimeter wave frequency bands in the range of 30 GHz to 300 GHz and/or upper centimeter wave frequencies in the range of 6 GHz to 30 GHz, or more particularly, 24 GHz to 30 GHz. Cellular user equipment can communicate using beamforming and/or other techniques over a wide range of frequencies, including, for example, FR2-1 (24 GHz to 52 GHz), FR2-2 (52 GHz to 71 GHz), and/or FR1 (400 MHz to 7125 MHz).

Different users of the communication network 10 can share available network resources, such as available frequency spectrum, in a wide variety of ways.

In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDMA is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Enhanced mobile broadband (eMBB) refers to technology for growing system capacity of LTE networks. For example, eMBB can refer to communications with a peak data rate of at least 10 Gbps and a minimum of 100 Mbps for each user. Ultra-reliable low latency communications (uRLLC) refers to technology for communication with very low latency, for instance, less than 2 milliseconds. uRLLC can be used for mission-critical communications such as for autonomous driving and/or remote surgery applications. Massive machine-type communications (mMTC) refers to low cost and low data rate communications associated with wireless connections to everyday objects, such as those associated with Internet of Things (IoT) applications.

The communication network 10 of FIG. 1 can be used to support a wide variety of advanced communication features, including, but not limited to, eMBB, uRLLC, and/or mMTC.

Figure 2A:
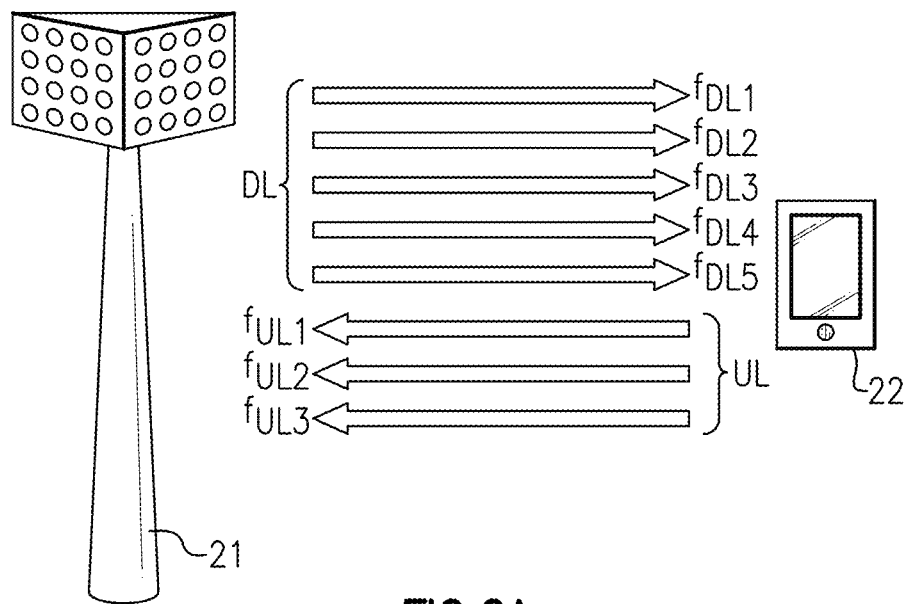
FIG. 2A is a schematic diagram of one example of a communication link using carrier aggregation.

FIG. 2A is a schematic diagram of one example of a communication link using carrier aggregation. Carrier aggregation can be used to widen bandwidth of the communication link by supporting communications over multiple frequency carriers, thereby increasing user data rates and enhancing network capacity by utilizing fragmented spectrum allocations.

In the illustrated example, the communication link is provided between a base station 21 and a mobile device 22. As shown in FIG. 2A, the communications link includes a downlink channel used for RF communications from the base station 21 to the mobile device 22, and an uplink channel used for RF communications from the mobile device 22 to the base station 21.

Although FIG. 2A illustrates carrier aggregation in the context of FDD communications, carrier aggregation can also be used for TDD communications.

In certain implementations, a communication link can provide asymmetrical data rates for a downlink channel and an uplink channel. For example, a communication link can be used to support a relatively high downlink data rate to enable high speed streaming of multimedia content to a mobile device, while providing a relatively slower data rate for uploading data from the mobile device to the cloud.

In the illustrated example, the base station 21 and the mobile device 22 communicate via carrier aggregation, which can be used to selectively increase bandwidth of the communication link. Carrier aggregation includes contiguous aggregation, in which contiguous carriers within the same operating frequency band are aggregated. Carrier aggregation can also be non-contiguous, and can include carriers separated in frequency within a common band or in different bands.

In the example shown in FIG. 2A, the uplink channel includes three aggregated component carriers $f_{UL1}$, $f_{UL2}$, and $f_{UL3}$. Additionally, the downlink channel includes five aggregated component carriers $f_{DL1}$, $f_{DL2}$, $f_{DL3}$, $f_{DL4}$, and $f_{DL5}$. Although one example of component carrier aggregation is shown, more or fewer carriers can be aggregated for uplink and/or downlink. Moreover, a number of aggregated carriers can be varied over time to achieve desired uplink and downlink data rates.

For example, a number of aggregated carriers for uplink and/or downlink communications with respect to a particular mobile device can change over time. For example, the number of aggregated carriers can change as the device moves through the communication network and/or as network usage changes over time.

Figure 2B:
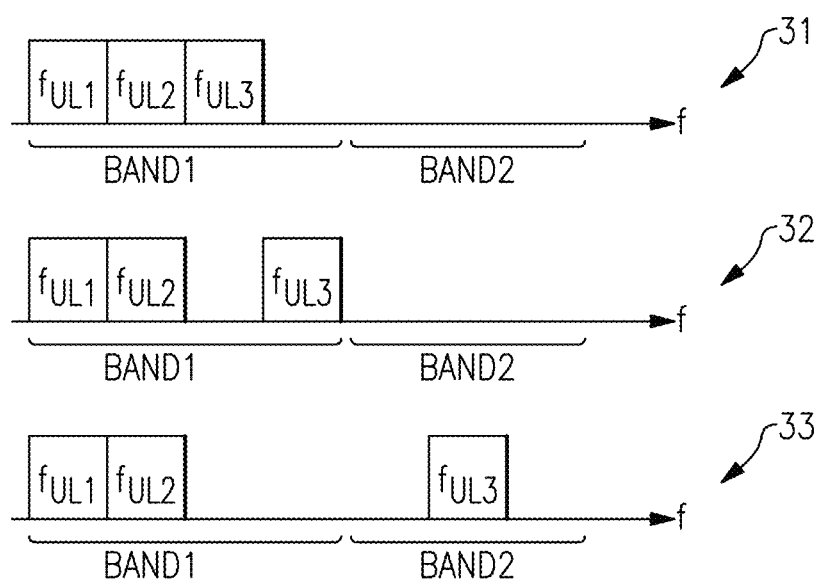
FIG. 2B illustrates various examples of uplink carrier aggregation for the communication link of FIG. 2A.

FIG. 2B illustrates various examples of uplink carrier aggregation for the communication link of FIG. 2A. FIG. 2B includes a first carrier aggregation scenario 31, a second carrier aggregation scenario 32, and a third carrier aggregation scenario 33, which schematically depict three types of carrier aggregation.

The carrier aggregation scenarios 31-33 illustrate different spectrum allocations for a first component carrier $f_{UL1}$, a second component carrier $f_{UL2}$, and a third component carrier $f_{UL3}$. Although FIG. 2B is illustrated in the context of aggregating three component carriers, carrier aggregation can be used to aggregate more or fewer carriers. Moreover, although illustrated in the context of uplink, the aggregation scenarios are also applicable to downlink.

The first carrier aggregation scenario 31 illustrates intra-band contiguous carrier aggregation, in which component carriers that are adjacent in frequency and in a common frequency band are aggregated. For example, the first carrier aggregation scenario 31 depicts aggregation of component carriers $f_{UL1}$, $f_{UL2}$, and $f_{UL3}$ that are contiguous and located within a first frequency band BAND1.

With continuing reference to FIG. 2B, the second carrier aggregation scenario 32 illustrates intra-band non-continuous carrier aggregation, in which two or more components carriers that are non-adjacent in frequency and within a common frequency band are aggregated. For example, the second carrier aggregation scenario 32 depicts aggregation of component carriers $f_{UL1}$, $f_{UL2}$, and $f_{UL3}$ that are non-contiguous, but located within a first frequency band BAND1.

The third carrier aggregation scenario 33 illustrates inter-band non-contiguous carrier aggregation, in which component carriers that are non-adjacent in frequency and in multiple frequency bands are aggregated. For example, the third carrier aggregation scenario 33 depicts aggregation of component carriers $f_{UL1}$ and $f_{UL2}$ of a first frequency band BAND1 with component carrier $f_{UL3}$ of a second frequency band BAND2.

Figure 2C:
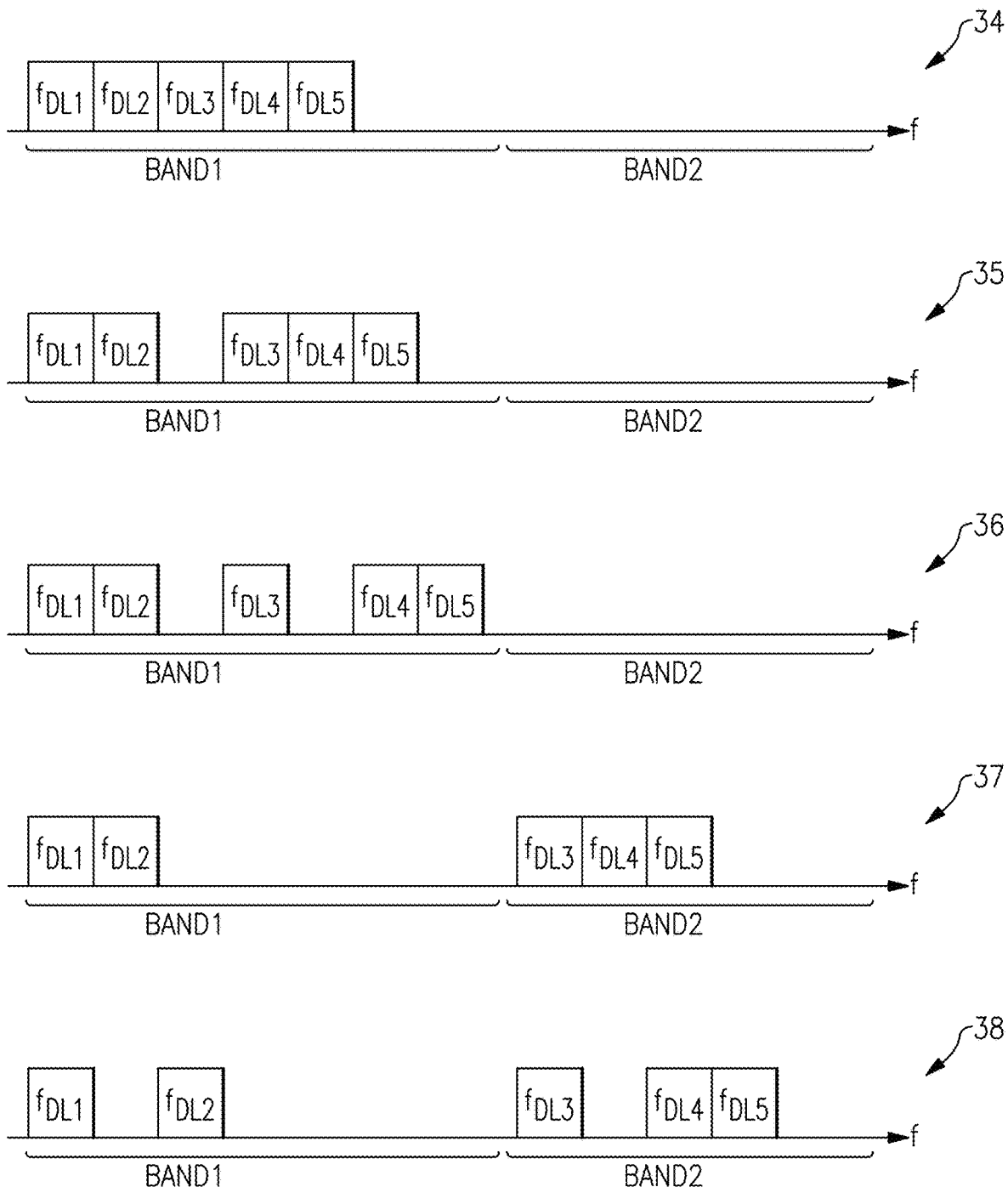
FIG. 2C illustrates various examples of downlink carrier aggregation for the communication link of FIG. 2A.

FIG. 2C illustrates various examples of downlink carrier aggregation for the communication link of FIG. 2A. The examples depict various carrier aggregation scenarios 34-38 for different spectrum allocations of a first component carrier $f_{DL1}$, a second component carrier $f_{DL2}$, a third component carrier $f_{DL3}$, a fourth component carrier $f_{DL4}$, and a fifth component carrier $f_{DL5}$. Although FIG. 2C is illustrated in the context of aggregating five component carriers, carrier aggregation can be used to aggregate more or fewer carriers. Moreover, although illustrated in the context of downlink, the aggregation scenarios are also applicable to uplink.

The first carrier aggregation scenario 34 depicts aggregation of component carriers that are contiguous and located within the same frequency band. Additionally, the second carrier aggregation scenario 35 and the third carrier aggregation scenario 36 illustrates two examples of aggregation that are non-contiguous, but located within the same frequency band. Furthermore, the fourth carrier aggregation scenario 37 and the fifth carrier aggregation scenario 38 illustrates two examples of aggregation in which component carriers that are non-adjacent in frequency and in multiple frequency bands are aggregated. As a number of aggregated component carriers increases, a complexity of possible carrier aggregation scenarios also increases.

With reference to FIGS. 2A-2C, the individual component carriers used in carrier aggregation can be of a variety of frequencies, including, for example, frequency carriers in the same band or in multiple bands. Additionally, carrier aggregation is applicable to implementations in which the individual component carriers are of about the same bandwidth as well as to implementations in which the individual component carriers have different bandwidths.

Certain communication networks allocate a particular user device with a primary component carrier (PCC) or anchor carrier for uplink and a PCC for downlink. Additionally, when the mobile device communicates using a single frequency carrier for uplink or downlink, the user device communicates using the PCC. To enhance bandwidth for uplink communications, the uplink PCC can be aggregated with one or more uplink secondary component carriers (SCCs). Additionally, to enhance bandwidth for downlink communications, the downlink PCC can be aggregated with one or more downlink SCCs.

In certain implementations, a communication network provides a network cell for each component carrier. Additionally, a primary cell can operate using a PCC, while a secondary cell can operate using a SCC. The primary and secondary cells may have different coverage areas, for instance, due to differences in frequencies of carriers and/or network environment.

License assisted access (LAA) refers to downlink carrier aggregation in which a licensed frequency carrier associated with a mobile operator is aggregated with a frequency carrier in unlicensed spectrum, such as WiFi. LAA employs a downlink PCC in the licensed spectrum that carries control and signaling information associated with the communication link, while unlicensed spectrum is aggregated for wider downlink bandwidth when available. LAA can operate with dynamic adjustment of secondary carriers to avoid WiFi users and/or to coexist with WiFi users. Enhanced license assisted access (eLAA) refers to an evolution of LAA that aggregates licensed and unlicensed spectrum for both downlink and uplink. Furthermore, NR-U can operate on top of LAA/eLAA over a 5 GHz band (5150 to 5925 MHz) and/or a 6 GHz band (5925 MHz to 7125 MHz).

Figure 3A:
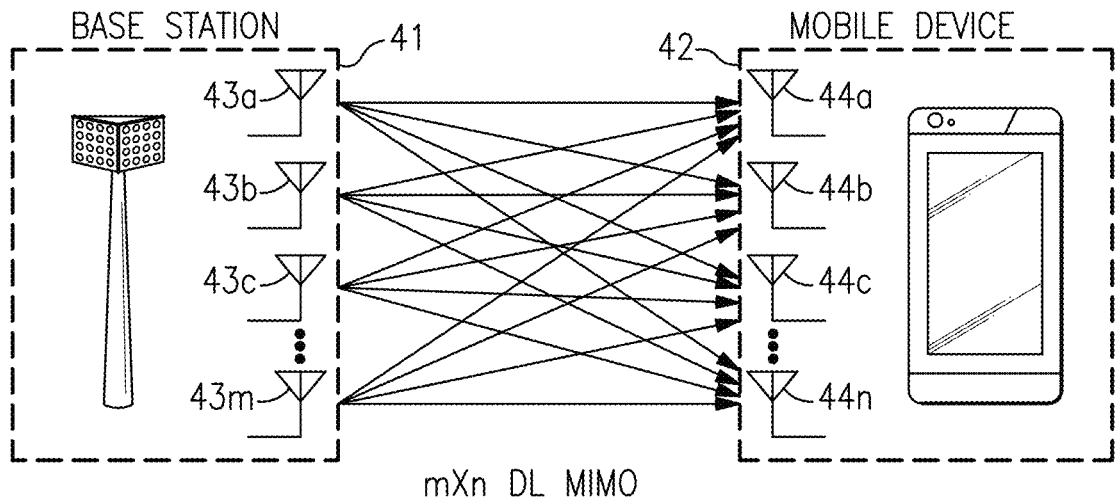
FIG. 3A is a schematic diagram of one example of a downlink channel using multi-input and multi-output (MIMO) communications.
Figure 3B:
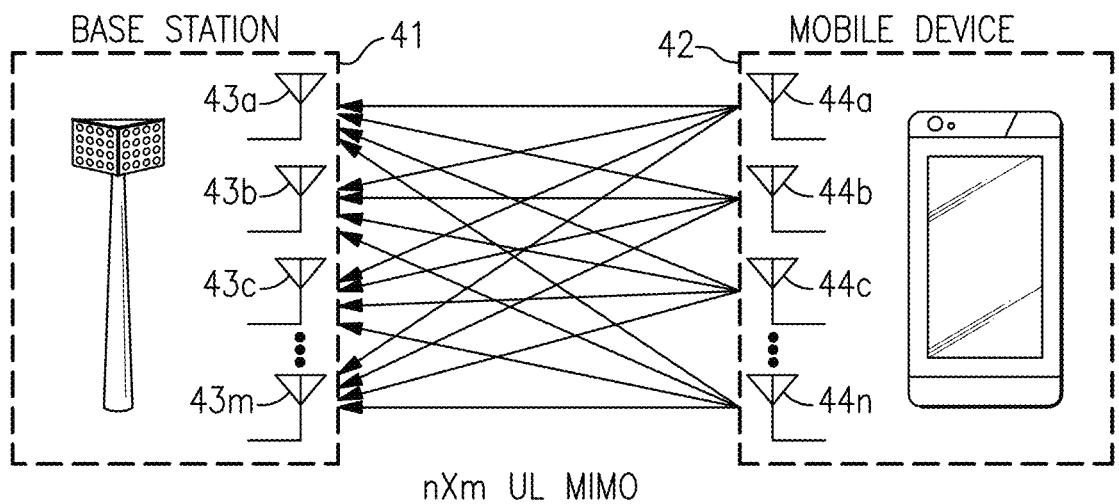
FIG. 3B is schematic diagram of one example of an uplink channel using MIMO communications.

FIG. 3A is a schematic diagram of one example of a downlink channel using multi-input and multi-output (MIMO) communications. FIG. 3B is schematic diagram of one example of an uplink channel using MIMO communications.

MIMO communications use multiple antennas for simultaneously communicating multiple data streams over common frequency spectrum. In certain implementations, the data streams operate with different reference signals to enhance data reception at the receiver. MIMO communications benefit from higher SNR, improved coding, and/or reduced signal interference due to spatial multiplexing differences of the radio environment.

MIMO order refers to a number of separate data streams sent or received. For instance, MIMO order for downlink communications can be described by a number of transmit antennas of a base station and a number of receive antennas for UE, such as a mobile device. For example, two-by-two (2×2) DL MIMO refers to MIMO downlink communications using two base station antennas and two UE antennas. Additionally, four-by-four (4×4) DL MIMO refers to MIMO downlink communications using four base station antennas and four UE antennas.

In the example shown in FIG. 3A, downlink MIMO communications are provided by transmitting using M antennas 43a, 43b, 43c, . . . 43m of the base station 41 and receiving using N antennas 44a, 44b, 44c, . . . 44n of the mobile device 42. Accordingly, FIG. 3A illustrates an example of m×n DL MIMO.

Likewise, MIMO order for uplink communications can be described by a number of transmit antennas of UE, such as a mobile device, and a number of receive antennas of a base station. For example, 2×2 UL MIMO refers to MIMO uplink communications using two UE antennas and two base station antennas. Additionally, 4×4 UL MIMO refers to MIMO uplink communications using four UE antennas and four base station antennas.

In the example shown in FIG. 3B, uplink MIMO communications are provided by transmitting using N antennas 44a, 44b, 44c, . . . 44n of the mobile device 42 and receiving using M antennas 43a, 43b, 43c, . . . 43m of the base station 41. Accordingly, FIG. 3B illustrates an example of n×m UL MIMO.

By increasing the level or order of MIMO, bandwidth of an uplink channel and/or a downlink channel can be increased.

MIMO communications are applicable to communication links of a variety of types, such as FDD communication links and TDD communication links.

Figure 3C:
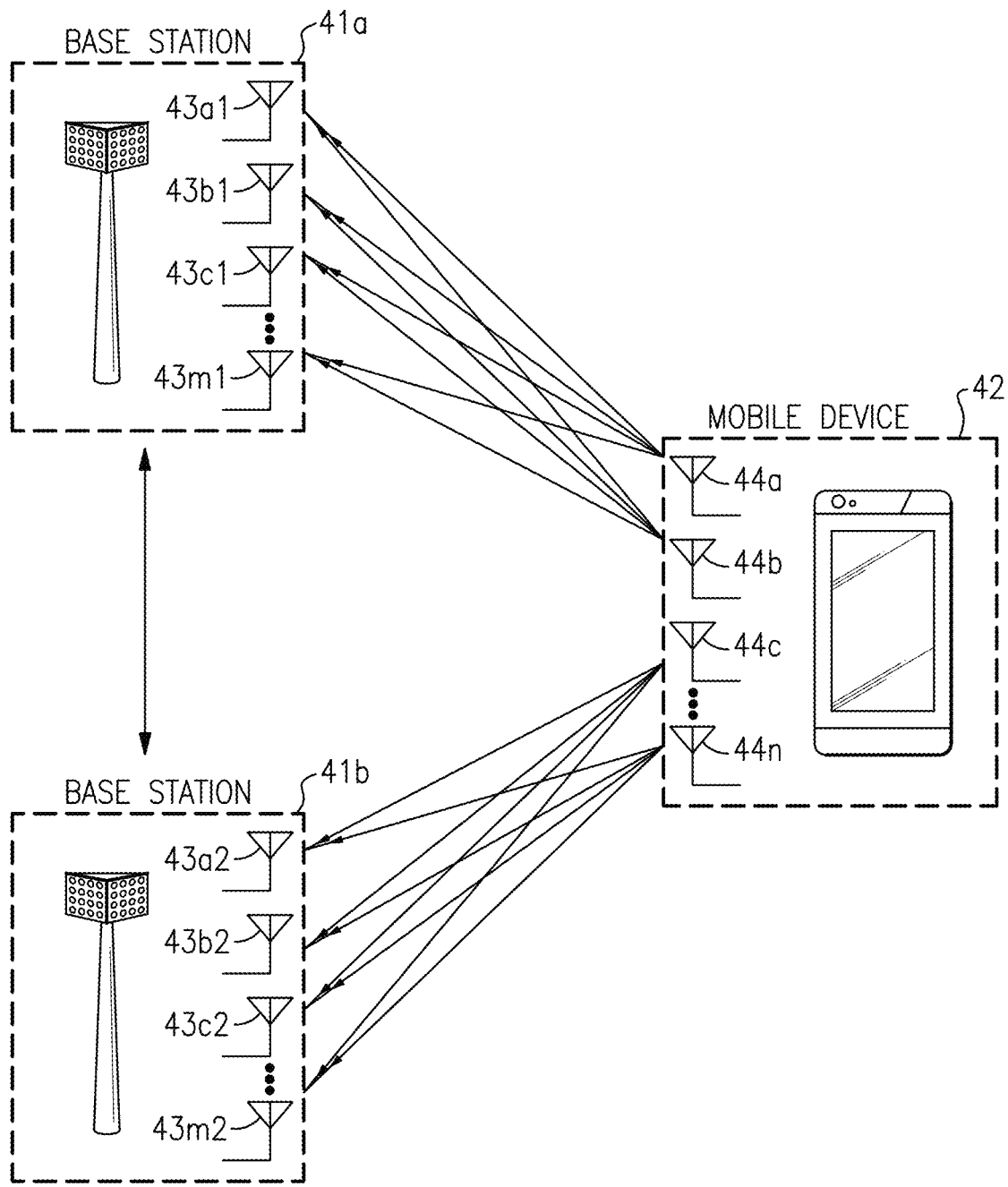
FIG. 3C is schematic diagram of another example of an uplink channel using MIMO communications.

FIG. 3C is schematic diagram of another example of an uplink channel using MIMO communications. In the example shown in FIG. 3C, uplink MIMO communications are provided by transmitting using N antennas 44a, 44b, 44c, . . . 44n of the mobile device 42. Additional a first portion of the uplink transmissions are received using M antennas 43a1, 43b1, 43c1, . . . 43m1 of a first base station 41a, while a second portion of the uplink transmissions are received using M antennas 43a2, 43b2, 43c2, . . . 43m2 of a second base station 41b. Additionally, the first base station 41a and the second base station 41b communication with one another over wired, optical, and/or wireless links.

The MIMO scenario of FIG. 3C illustrates an example in which multiple base stations cooperate to facilitate MIMO communications.

Figure 4A:
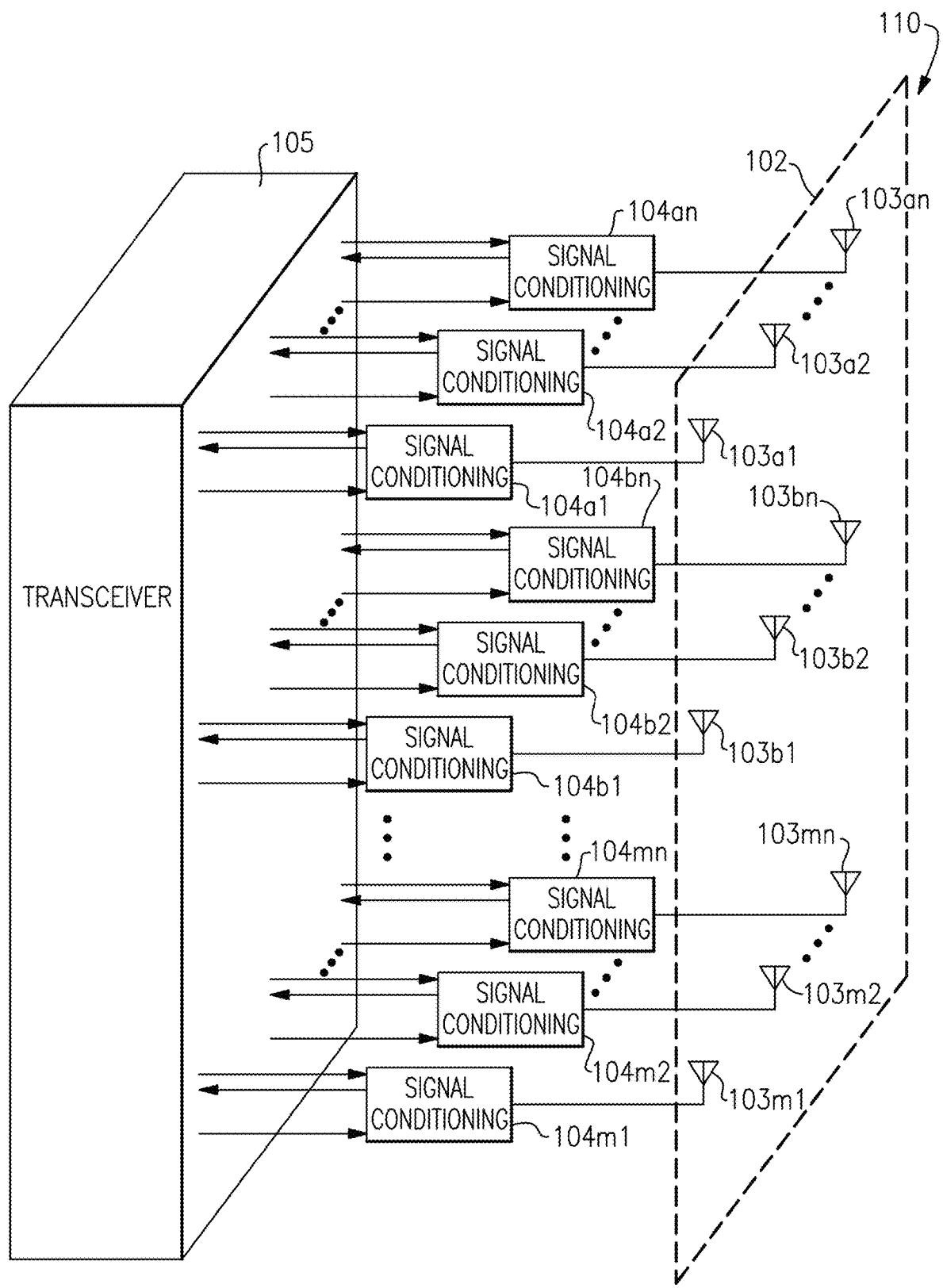
FIG. 4A is a schematic diagram of one example of a communication system that operates with beamforming.

FIG. 4A is a schematic diagram of one example of a communication system 110 that operates with beamforming. The communication system 110 includes a transceiver 105, signal conditioning circuits 104a1, 104a2 . . . 104an, 104b1, 104b2 . . . 104bn, 104m1, 104m2 . . . 104mn, and an antenna array 102 that includes antenna elements 103a1, 103a2 . . . 103an, 103b1, 103b2 . . . 103bn, 103m1, 103m2 . . . 103mn.

Communications systems that communicate using millimeter wave carriers (for instance, 30 GHz to 300 GHz), centimeter wave carriers (for instance, 3 GHz to 30 GHz), and/or other frequency carriers can employ an antenna array to provide beam formation and directivity for transmission and/or reception of signals.

For example, in the illustrated embodiment, the communication system 110 includes an array 102 of m×n antenna elements, which are each controlled by a separate signal conditioning circuit, in this embodiment. As indicated by the ellipses, the communication system 110 can be implemented with any suitable number of antenna elements and signal conditioning circuits.

With respect to signal transmission, the signal conditioning circuits can provide transmit signals to the antenna array 102 such that signals radiated from the antenna elements combine using constructive and destructive interference to generate an aggregate transmit signal exhibiting beam-like qualities with more signal strength propagating in a given direction away from the antenna array 102.

In the context of signal reception, the signal conditioning circuits process the received signals (for instance, by separately controlling received signal phases) such that more signal energy is received when the signal is arriving at the antenna array 102 from a particular direction. Accordingly, the communication system 110 also provides directivity for reception of signals.

The relative concentration of signal energy into a transmit beam or a receive beam can be enhanced by increasing the size of the array. For example, with more signal energy focused into a transmit beam, the signal is able to propagate for a longer range while providing sufficient signal level for RF communications. For instance, a signal with a large proportion of signal energy focused into the transmit beam can exhibit high effective isotropic radiated power (EIRP).

In the illustrated embodiment, the transceiver 105 provides transmit signals to the signal conditioning circuits and processes signals received from the signal conditioning circuits. As shown in FIG. 4A, the transceiver 105 generates control signals for the signal conditioning circuits. The control signals can be used for a variety of functions, such as controlling the gain and phase of transmitted and/or received signals to control beamforming.

Figure 4B:
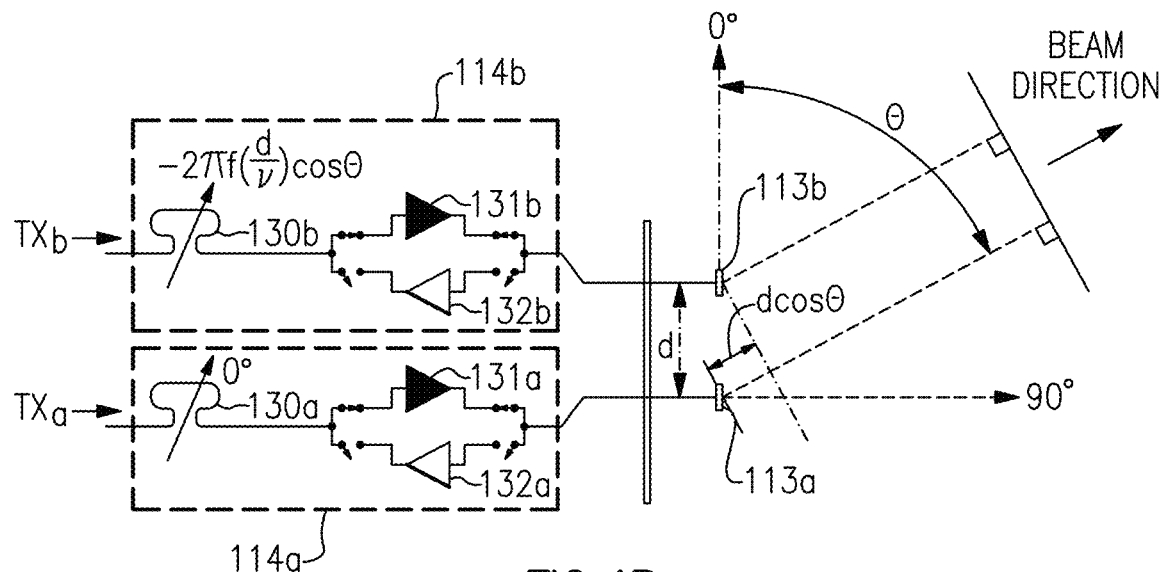
FIG. 4B is a schematic diagram of one example of beamforming to provide a transmit beam.

FIG. 4B is a schematic diagram of one example of beamforming to provide a transmit beam. FIG. 4B illustrates a portion of a communication system including a first signal conditioning circuit 114a, a second signal conditioning circuit 114b, a first antenna element 113a, and a second antenna element 113b.

Although illustrated as included two antenna elements and two signal conditioning circuits, a communication system can include additional antenna elements and/or signal conditioning circuits. For example, FIG. 4B illustrates one embodiment of a portion of the communication system 110 of FIG. 4A.

The first signal conditioning circuit 114a includes a first phase shifter 130a, a first power amplifier 131a, a first low noise amplifier (LNA) 132a, and switches for controlling selection of the power amplifier 131a or LNA 132a. Additionally, the second signal conditioning circuit 114b includes a second phase shifter 130b, a second power amplifier 131b, a second LNA 132b, and switches for controlling selection of the power amplifier 131b or LNA 132b.

Although one embodiment of signal conditioning circuits is shown, other implementations of signal conditioning circuits are possible. For instance, in one example, a signal conditioning circuit includes one or more band filters, duplexers, and/or other components.

In the illustrated embodiment, the first antenna element 113a and the second antenna element 113b are separated by a distance d. Additionally, FIG. 4B has been annotated with an angle $\theta$, which in this example has a value of about 90° when the transmit beam direction is substantially perpendicular to a plane of the antenna array and a value of about 0° when the transmit beam direction is substantially parallel to the plane of the antenna array.

By controlling the relative phase of the transmit signals provided to the antenna elements 113a, 113b, a desired transmit beam angle $\theta$ can be achieved. For example, when the first phase shifter 130a has a reference value of 0°, the second phase shifter 130b can be controlled to provide a phase shift of about $-2\pi f(d/v)\cos\theta$ radians, where f is the fundamental frequency of the transmit signal, d is the distance between the antenna elements, v is the velocity of the radiated wave, and $\pi$ is the mathematic constant pi.

In certain implementations, the distance d is implemented to be about $\frac{1}{2}\lambda$, where $\lambda$ is the wavelength of the fundamental component of the transmit signal. In such implementations, the second phase shifter 130b can be controlled to provide a phase shift of about $-\pi\cos\theta$ radians to achieve a transmit beam angle $\theta$.

Accordingly, the relative phase of the phase shifters 130a, 130b can be controlled to provide transmit beamforming. In certain implementations, a baseband processor and/or a transceiver (for example, the transceiver 105 of FIG. 4A) controls phase values of one or more phase shifters and gain values of one or more controllable amplifiers to control beamforming.

Figure 4C:
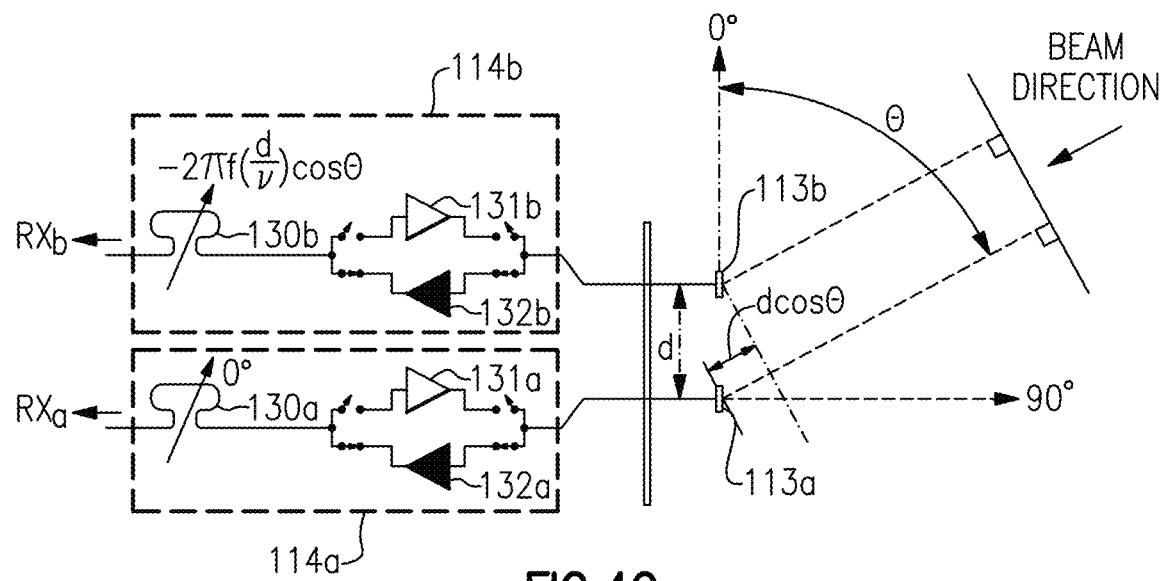
FIG. 4C is a schematic diagram of one example of beamforming to provide a receive beam.

FIG. 4C is a schematic diagram of one example of beamforming to provide a receive beam. FIG. 4C is similar to FIG. 4B, except that FIG. 4C illustrates beamforming in the context of a receive beam rather than a transmit beam.

As shown in FIG. 4C, a relative phase difference between the first phase shifter 130a and the second phase shifter 130b can be selected to about equal to $-2\pi f(d/v)\cos\theta$ radians to achieve a desired receive beam angle $\theta$. In implementations in which the distance d corresponds to about $\frac{1}{2}\lambda$, the phase difference can be selected to about equal to $-\pi\cos\theta$ radians to achieve a receive beam angle $\theta$.

Although various equations for phase values to provide beamforming have been provided, other phase selection values are possible, such as phase values selected based on implementation of an antenna array, implementation of signal conditioning circuits, and/or a radio environment.

Programmable Voltage Regulators and Regulation Schemes for Powering Multiple Circuit Blocks Provided herein are programmable voltage regulators and regulation schemes suitable for powering multiple circuit blocks. In certain embodiments, a semiconductor die includes a reference voltage circuit (for instance, a bandgap reference circuit) that generates a reference voltage based on a power supply voltage that is operable with multiple voltage levels associated with different power supply domains, and a programmable voltage regulator that generates a programmable regulated voltage based on the reference voltage. The semiconductor die further includes multiple circuit blocks (which can include, for instance, a digital core, fuses, analog circuits, and/or RF circuits) that operate based on the programmable regulated voltage and that can each be individually enabled or disabled. The voltage level of the programmable regulated voltage is set based on the combination of circuit block(s) that are enabled (active) at a given time.

By controlling the programmable regulated voltage in this manner, a suitable voltage level is maintained for the active combination of circuit blocks. For example, the programmable regulated voltage can be set to a low voltage level when only the digital core is active, set to a high voltage level when the fuses are active and being programmed, or to a medium voltage level when the analog and/or RF circuits are active but the fuses are not. Furthermore, the semiconductor die can be deployed in multiple applications associated with different power supply domains.

The teachings herein can be used to support a front end module (FEM) application for millimeter wave (mmW) communications, in which a single programmable voltage regulator supports multiple circuit blocks associated with different regulated voltage constraints.

In contrast, an implementation using separate voltage regulators for each circuit block can result in large area and/or high power consumption. For example, high power dissipation and large die area can occur when using separate regulators for a digital core, fuses, analog circuits (for instance, analog sensors, digital-to-analog converters (DACs), analog-to-digital converters (ADCs), level shifters, analog buffers, drivers, and/or other analog circuitry), and RF circuits (for instance, amplifiers, bias circuits, phase shifters, modulators, demodulators, filters, and/or other RF circuitry).

Thus, rather than operating at the highest voltage level to accommodate a worst case scenario in which the fuses are being programmed, the programmable regulated voltage can be lowered when certain circuit blocks are disabled. By using a programmable voltage regulator in this manner, reduced power consumption (for instance, lower static power dissipation) can be achieved.

In certain implementations, the programmable voltage regulator is implemented as a low-dropout (LDO) regulator with programmable output voltage, fast response time (for instance, short wakeup time from an off-state to an on-state), overshoot control, programmable phase margin, and/or dynamic current loading limit. By providing such features, enhanced performance can be achieved.

In certain implementations, the programmable voltage regulator is included on a semiconductor die of a front end system, for instance, high performance front end modules for millimeter wave (mmW) communications.

Thus, the teachings herein can serve a wide variety of applications, including complex FEM applications utilizing mmW frequencies. For example, certain FEM applications desire a high output power/high linearity power amplifier (for instance, a cascode power amplifier fabricated in SOI CMOS) operating with a first power supply voltage (for instance, 2.5V+/−10% in a first domain or 3.3 V+/−10% in a second domain), voltage regulation circuitry (for instance, a reference voltage circuit and a programmable voltage regulator) operating with a second power supply voltage (for instance, 1.2V+/−10% or 1.8V+/−10%), and high performance analog circuits operating with a third power supply voltage (for instance, 1.0V+/−5%, 1.2V+/−10%, or 1.8V+/−10%). The programmable voltage regulators herein can be utilized in such FEM applications with varying power supply domains as well as in other applications and operating scenarios.

Figure 5:
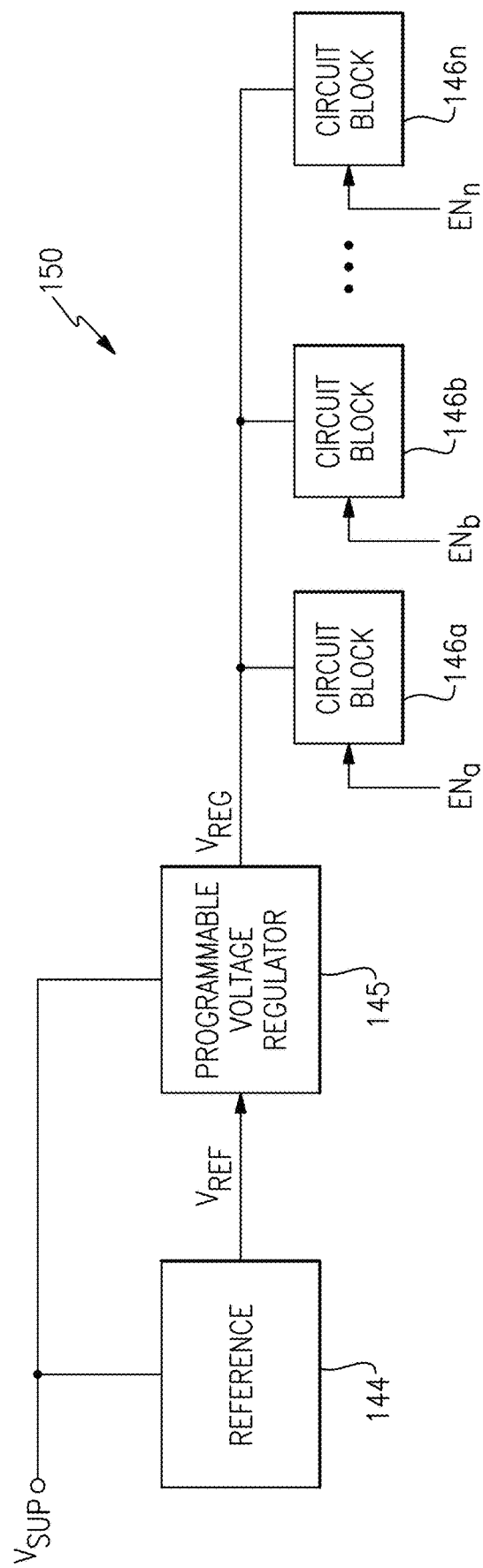
FIG. 5 is a schematic diagram of a semiconductor die according to one embodiment.

FIG. 5 is a schematic diagram of a semiconductor die 150 according to one embodiment. The semiconductor die 150 includes a reference voltage circuit 144, a programmable voltage regulator 145, and circuit blocks 146a, 146b, . . . 146n. The semiconductor die 150 receives a power supply voltage $V_{SUP}$ used to power the reference voltage circuit 144 and the programmable voltage regulator 145, in this embodiment.

As shown in FIG. 5, the reference voltage circuit 144 generates a reference voltage $V_{REF}$ based on the power supply voltage $V_{SUP}$, which is operable with multiple voltage levels associated with different power supply domains. Additionally, the programmable voltage regulator 145 generates a programmable regulated voltage $V_{REG}$ based on the reference voltage $V_{REF}$. The circuit blocks 146a, 146b, . . . 146n (which can include, for instance, a digital core, fuses, analog circuits, and/or RF circuits) operate based on the programmable regulated voltage $V_{REG}$ and are individually enabled or disabled using the enable signals $EN_a$, $EN_b$, . . . $EN_n$, respectively. The voltage level of the programmable regulated voltage $V_{REG}$ is set based on the circuit block(s) that are enabled at a given time.

By controlling the programmable voltage regulator 145 in this manner, a suitable voltage level is maintained for the active combination of circuit blocks. For example, the programmable regulated voltage $V_{REG}$ can be set to a low voltage level when only a digital core is active, set to a high voltage level when fuses are active and being programmed, or to a medium voltage level (a voltage level less than the high voltage level but greater than the low voltage level) when the analog and/or RF circuits are active but the fuses are not active. Furthermore, the semiconductor die 150 can be deployed in multiple applications associated with different power supply domains.

Figure 6:
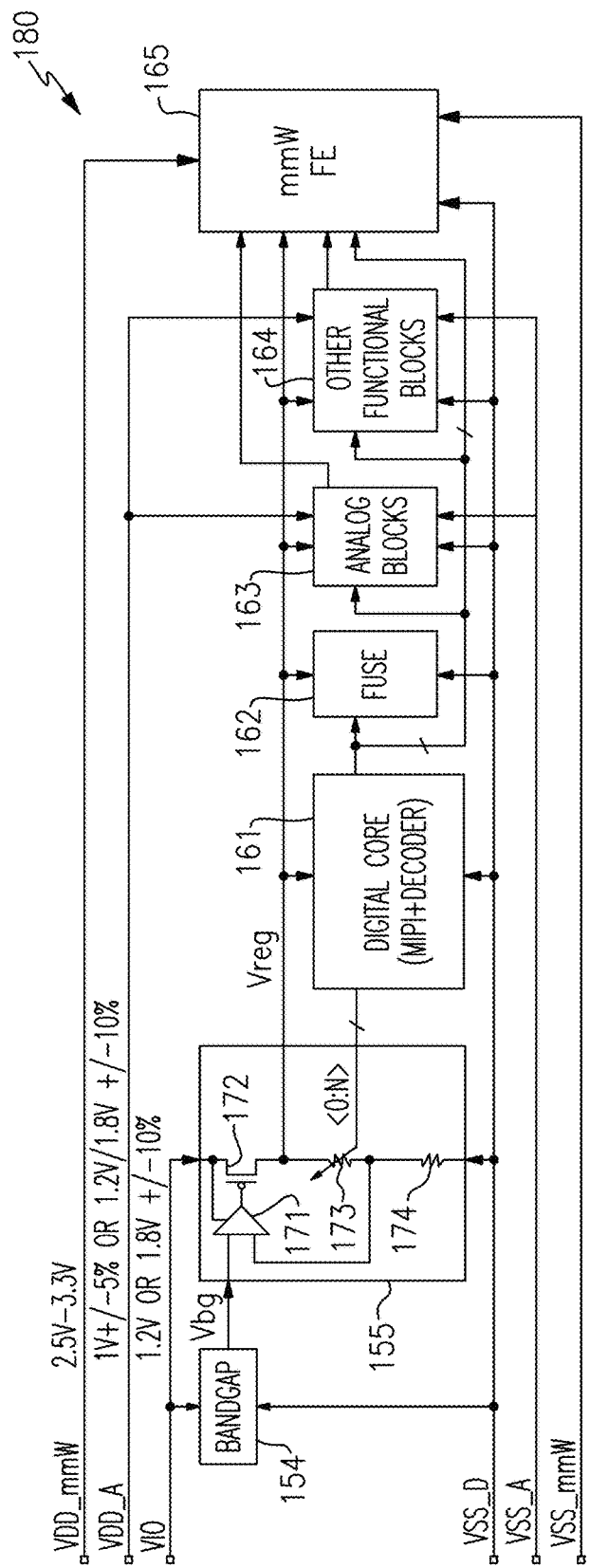
FIG. 6 is a schematic diagram of a semiconductor die according to another embodiment.

FIG. 6 is a schematic diagram of a semiconductor die 180 according to another embodiment. The semiconductor die 180 includes a bandgap reference circuit 154, a programmable LDO regulator 155, a digital core 161 (including, for instance, interface and decoder logic), a fuse circuit 162, analog circuit blocks 163, other functional blocks 164, and a mmW FE circuit 165. Various power supply pins are depicted for receiving various voltages including an RF power supply voltage VDD_mmW, an analog power supply voltage VDD_A, and input/output (I/O) power supply voltage VIO, an RF ground VSS_mmW, an analog ground VSS_A, and a digital ground VSS_D.

The power supply voltages are operable in different voltage domains and service different circuit blocks. In this example, the RF power supply voltage VDD_mmW (2.5V+/−10% in a first domain or 3.3 V+/−10% in a second domain) powers the mmW FE circuit 165, the I/O power supply voltage VIO (1.2V+/−10% or 1.8V+/−10%) powers the bandgap reference circuit 154 and the programmable LDO regulator 155, and the analog power supply voltage VDD_A (1.0V+/−5%, 1.2V+/−10%, or 1.8V+/−10%) powers the analog circuit blocks 163 and the other functional blocks 164. Additionally, the digital ground VSS_D is provided to all circuitry (for providing ground to various digital logic in each circuit as well as to low frequency analog circuitry), while the RF ground VSS_mmW is provided to the mmW FE circuit 165 and the analog ground VSS_A is provided to the analog circuit blocks 163 and other functional blocks 164. Although a specific configuration of power supply pins and circuits are depicted, other implementations are possible.

In the illustrated embodiment, the programmable LDO regulator 155 includes a regulating amplifier 171, a p-type field-effect transistor (PFET) 172, and a voltage divider including a first resistor 173 and a second resistor 174. The bandgap reference circuit 154 provides a bandgap voltage Vbg to a first input of the regulating amplifier 171, while the voltage divider provides a fraction of the programmable regulated voltage Vreg (corresponding to a feedback voltage) to a second input of the regulating amplifier 171. The output of the regulating amplifier 171 controls a gate of the PFET 172 (which can be a p-type metal oxide semiconductor transistor or PMOS transistor) to generate the programmable regulated voltage Vreg, which is provided to each of the digital core 161, the fuse circuit 162, the analog circuit blocks 163, the other functional blocks 164, and the mmW FE circuit 165.

As shown in FIG. 6, the digital core 161 controls a resistance of the first resistor 173 to control the voltage level of the programmable regulated voltage Vreg outputted from the programmable LDO regulator 155. Although one example of controlling the programmable regulated voltage Vreg is shown, other implementations of controlling the programmable regulated voltage are possible. For instance, in another example, the voltage level of the reference to the regulating amplifier 171 (for instance, Vbg) is controlled to set the programmable regulated voltage Vreg.

With continuing reference to FIG. 6, the digital core 161 also selectively enables each of the fuse circuit 162, the analog circuit blocks 163, the other functional blocks 164, and the mmW FE circuit 165. The digital core 161 sets the voltage level of the programmable regulated voltage Vreg based on a combination of the circuit blocks that are enabled at a given time.

By implementing the programmable LDO regulator 155 in this manner, a suitable voltage level is maintained for the active combination of circuit blocks.

In certain embodiments, the digital core 161 is coupled to an interface, for instance, a serial interface such as Mobile Industry Processor Interface (MIPI). Additionally, the digital core 161 enables a particular combination of circuit blocks based on data received over the interface.

The mmW FE circuit 165 is used to handle millimeter wave signals, such as cellular FR2 signals. For example, the mmW FE circuit 165 can include a power amplifier that amplifies an FR2 signal. Table 1 below depicts various examples of 5G FR2 frequency bands, and correspond to example frequency bands for the signals handled by the mmW FE circuit 165.

TABLE 1

| 5G Frequency Band | Band Duplex Type | UL/DL Low [MHz] | UL/DL High [MHz] |
|---|---|---|---|
| n257 | TDD | 26500 | 29500 |
| n258 | TDD | 24250 | 27500 |
| n259 | TDD | 39500 | 43500 |
| n260 | TDD | 37000 | 40000 |
| n261 | TDD | 27500 | 28350 |
| n262 | TDD | 47200 | 48200 |
| n263 | TDD | 57000 | 71000 |

Figure 7:
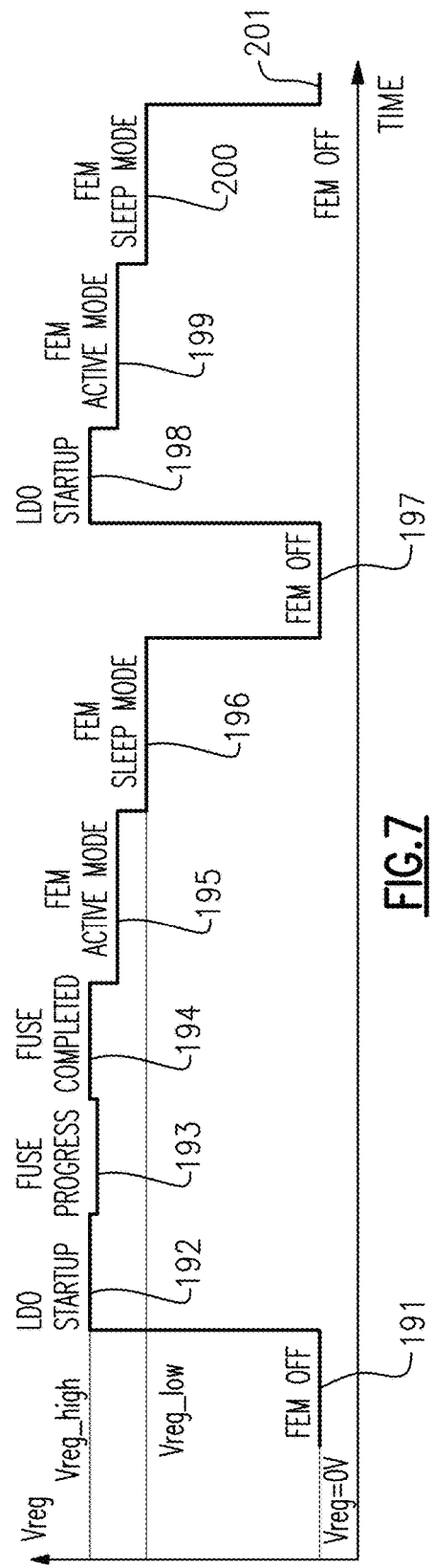
FIG. 7 is one example of a graph of a programmable regulated voltage versus time for the semiconductor die of FIG. 6.

FIG. 7 is one example of a graph of a programmable regulated voltage versus time for the semiconductor die 180 of FIG. 6. The graph includes different time slots in which the semiconductor die 180 is in a particular mode or state associated with different circuit blocks being active. The graph depicts the voltage level of the programmable regulated voltage Vreg for each time slot. The time slots include a sequence to time slots 191, 192, 193, 194, 195, 196, 197, 198, 199, 200, and 201.

With continuing reference to FIG. 7, when the semiconductor die 180 is off (time slots 191, 197, and 201) the programmable regulated voltage Vreg is off (for instance, Vreg=0V). Additionally, when the semiconductor die 180 is in a sleep mode (time slots 196 and 200 in which the digital core 161 is active and the other circuit blocks receiving Vreg are powered off) the programmable regulated voltage Vreg is set to a first or low voltage level (Vreg_low). Additionally, when the mmW FE 165 and associated circuit blocks are active (time slots 195 and 199), the programmable regulated voltage Vreg is set to a second voltage level greater than the first voltage level. Furthermore, when the fuse circuit 162 is active (time slot 193 associate with setting fuse states, for instance, during a start-up sequence associated with blowing fuses), the programmable regulated voltage Vreg is set to a third voltage level greater than the second voltage level. Additionally, during start-up (time slots 192 and 198) or after completing fusing (time slot 194) the programmable regulated voltage Vreg is set to a fourth or highest voltage level (Vreg_high).

Although one example of voltage levels and sequencing is shown, other implementations and/or sequences are possible. Furthermore, more or fewer programmable voltage levels can be used.

Figure 8:
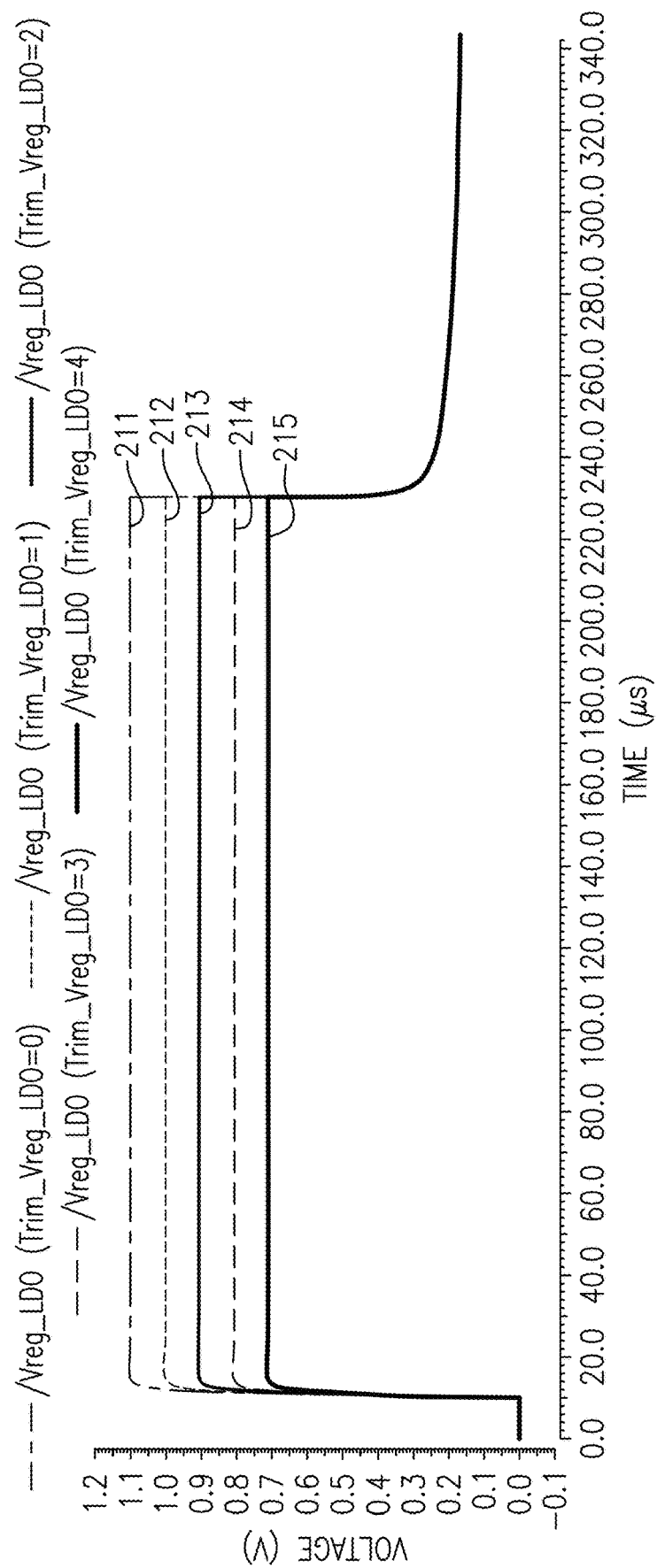
FIG. 8 is one example of a graph of programmable regulated voltage versus time for different programmed voltage levels.

FIG. 8 is one example of a graph of programmable regulated voltage versus time for different programmed voltage levels. The graph depicts a power-up and power-down sequence for the regulator for five different settings (corresponding to graphs 211, 212, 213, 214, and 215) of the programmable regulated voltage.

Figure 9:
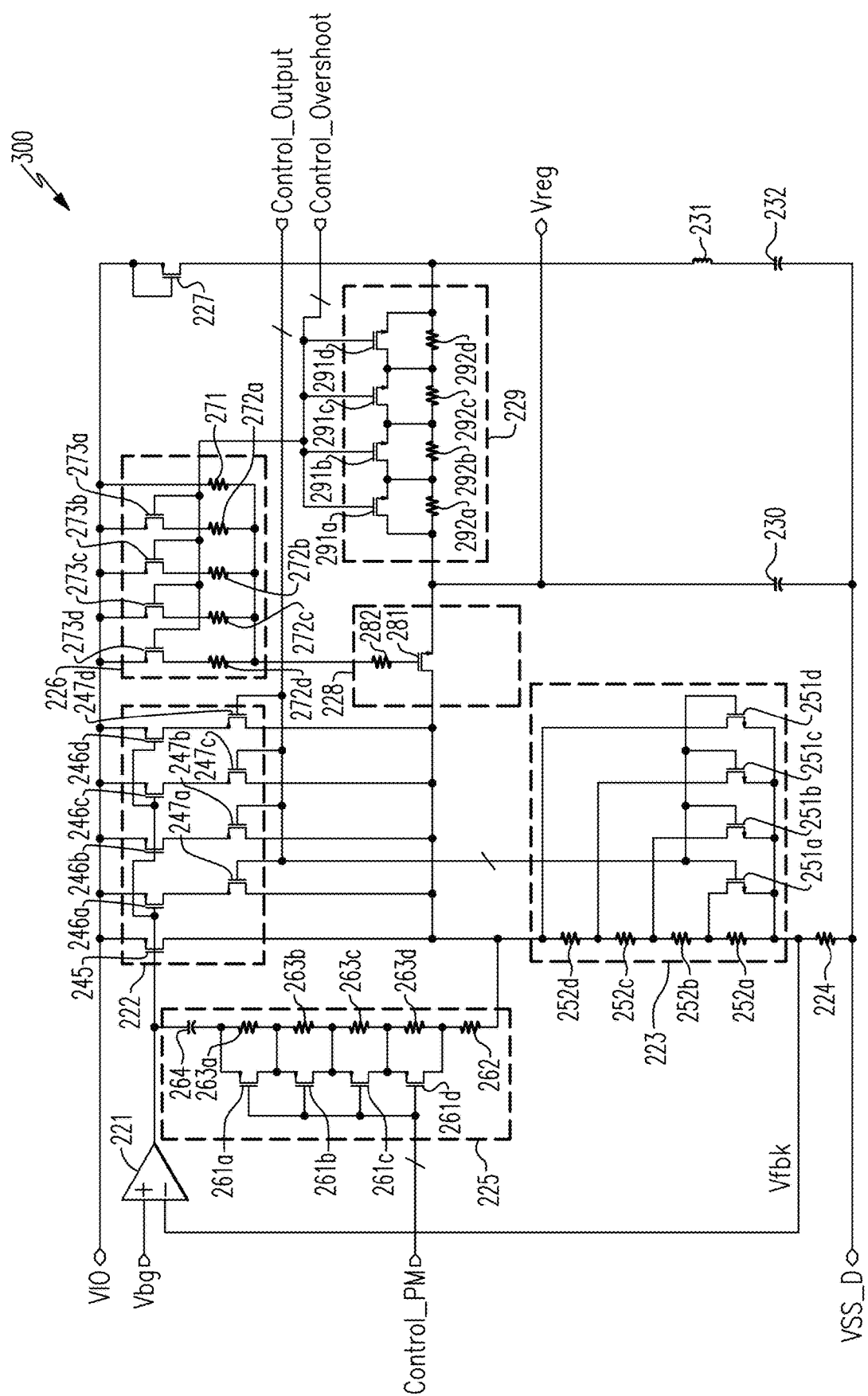
FIG. 9 is a schematic diagram of one embodiment of a programmable low dropout (LDO) regulator.

FIG. 9 is a schematic diagram of one embodiment of a programmable LDO regulator 300. The programmable LDO regulator 300 includes a regulating amplifier 221, a controllable regulation transistor 222, a voltage divider (including a first resistor 223 that is controllable and a second resistor 224 that is fixed, in this example), a controllable compensation circuit 225, a time constant control circuit 226, a discharge control circuit (implemented as a diode-connected transistor 227, in this example), an overshoot control circuit 228, a resistance adjustment circuit 229, an on-chip capacitor 230, a parasitic inductor 231, and an off-chip capacitor 232.

As shown in FIG. 9, the programmable LDO regulator 300 is powered by a power supply voltage VIO and a ground voltage VSS_D. The programmable regulator 300 receives a bandgap reference voltage Vbg, and generates a programmable regulated voltage Vreg, which is programmable (using a first multi-bit control signal Control_Output). The LDO regulator 300 also has a programmable phase margin (using a second multi-bit control signal Control_PM) and a programmable overshoot control (using a third multi-bit control signal Control_Overshoot).

In the illustrated embodiment, a first input (non-inverted input, in this example) of the regulating amplifier 221 receives the bandgap reference voltage Vbg, while a second input (inverted input, in this example) of the regulating amplifier 221 receives a feedback voltage Vfbk from the voltage divider. An output of the regulating amplifier 221 controls a gate of the controllable regulation transistor 222.

As shown in FIG. 9, the first resistor 223 of the voltage divider is controllable, in this embodiment. In particular, in this example the first resistor 223 includes resistor elements 252a, 252b, 252c, and 252d that are selectable by selection transistors 251a, 251b, 251c, and 251d, respectively, which are controlled by the first multi-bit control signal (Control_Output). Thus, the resistance of the first resistor 223 changes based on the setting of the first multi-bit control signal.

The first multi-bit control signal (Control_Output) also controls a transistor size of the controllable regulation transistor 222, in this embodiment. In particular, in this example the controllable regulation transistor 222 includes a fixed regulation transistor 245 that operates in combination with selectable regulation transistors 246a, 246b, 246c, and 246d. The selectable regulation transistors 246a, 246b, 246c, and 246d are selected by the selection transistors 247a, 247b, 247c, and 247d, respectively, which are controlled by the first multi-bit control signal (Control_Output).

With continuing reference to FIG. 9, the controllable compensation circuit 225 is connected across the gate and drain of the controllable regulation transistor 222 to provide frequency compensation. The controllable compensation circuit 225 has a resistance that is adjustable by the second multi-bit control signal (Control_PM) to provide varying amounts of frequency compensation, thereby adjusting phase margin. In particular, in this example, the controllable compensation circuit 225 includes a fixed resistor 262, selectable resistors 263a, 263b, 263c, and 263d, and a fixed capacitor 264 in series. Additionally, the selectable resistors 263a, 263b, 263c, and 263d are selected by (using a selective bypass mechanism, in this example) the selection transistors 261a, 261b, 261c, and 261d, respectively, which are controlled by the second multi-bit control signal (Control_PM).

In the illustrated embodiment, the overshoot control circuit 228 is included between the drain of the controllable regulation transistor 222 and the programmable regulated voltage Vreg. In this example, the overshoot control circuit 228 includes an overshoot control transistor 281 providing a resistance between the drain of the controllable regulation transistor 222 and the programmable regulated voltage Vreg, and having a gate resistor 282. Additionally, the time constant control circuit 226 is connected in series with the gate resistor 282 between the power supply voltage VIO and the gate of the overshoot control transistor 281.

With continuing reference to FIG. 9, the time constant control circuit 226 is adjustable by the third multi-bit control signal (Control_Overshoot) to change a resistor-capacitor (RC) time constant associated with charging the gate of the overshoot control transistor 281 in response to a ramp-up (for instance, a power supply sequence at start-up) of the power supply voltage VIO. In this example, the time constant control circuit 226 includes a fixed resistor 271 in parallel with selectable resistors 272a, 272b, 272c, and 272d. Additionally, the selectable resistors 272a, 272b, 272c, and 272d are selected by the selection transistors 273a, 273b, 273c, and 273d, respectively, which are controlled by the third multi-bit control signal (Control_Overshoot).

Accordingly, the third multi-bit control signal (Control_Overshoot) serves to set the speed at which the gate of the overshoot control transistor 281 is charged (and thus, a corresponding output resistance for controlling the programmable regulated voltage Vreg) in response to a ramp-up of the power supply voltage VIO.

As shown in FIG. 9, the on-chip capacitor 230 is connected between the programmable regulated voltage Vreg and ground VSS_D. Additionally, the off-chip capacitor 232 is connected in series with the resistance adjustment circuit 229 between the programmable regulated voltage Vreg and ground VSS_D. The amount of resistance of the resistance adjustment circuit 229 is controlled by the third multi-bit control signal (Control_Overshoot). In particular, the resistance adjustment circuit 229 includes selectable resistors 292a, 292b, 292c, and 292d controlled by selection transistors 291a, 291b, 291c, and 291d, respectively, which are controlled by the third multi-bit control signal (Control_Overshoot). By controlling an amount of resistance between the off-chip capacitor 232 and the programmable regulated voltage Vreg, the overshoot of the programmable regulated voltage Vreg can be controlled. The resistance adjustment circuit 229 serves to adjust the equivalent series resistance (ESR) of the off-chip capacitor 232.

In this example, a parasitic inductance (for instance, associated with a bump or wire bond) is represented as an inductor 231.

In the illustrated embodiment, the discharge control circuit (implemented as the diode-connected transistor 227, in this example) is also included to aid in discharging the off-chip capacitor 232 when the power supply voltage VIO drops. For example, since the controllable regulation transistor 222 is p-type in this example, the controllable regulation transistor 222 can be slow at lowering (by discharging the capacitor 230) the programmable regulated voltage Vreg as compared to raising (by charging the capacitor 230) the programmable regulated voltage Vreg.

Figure 10A:
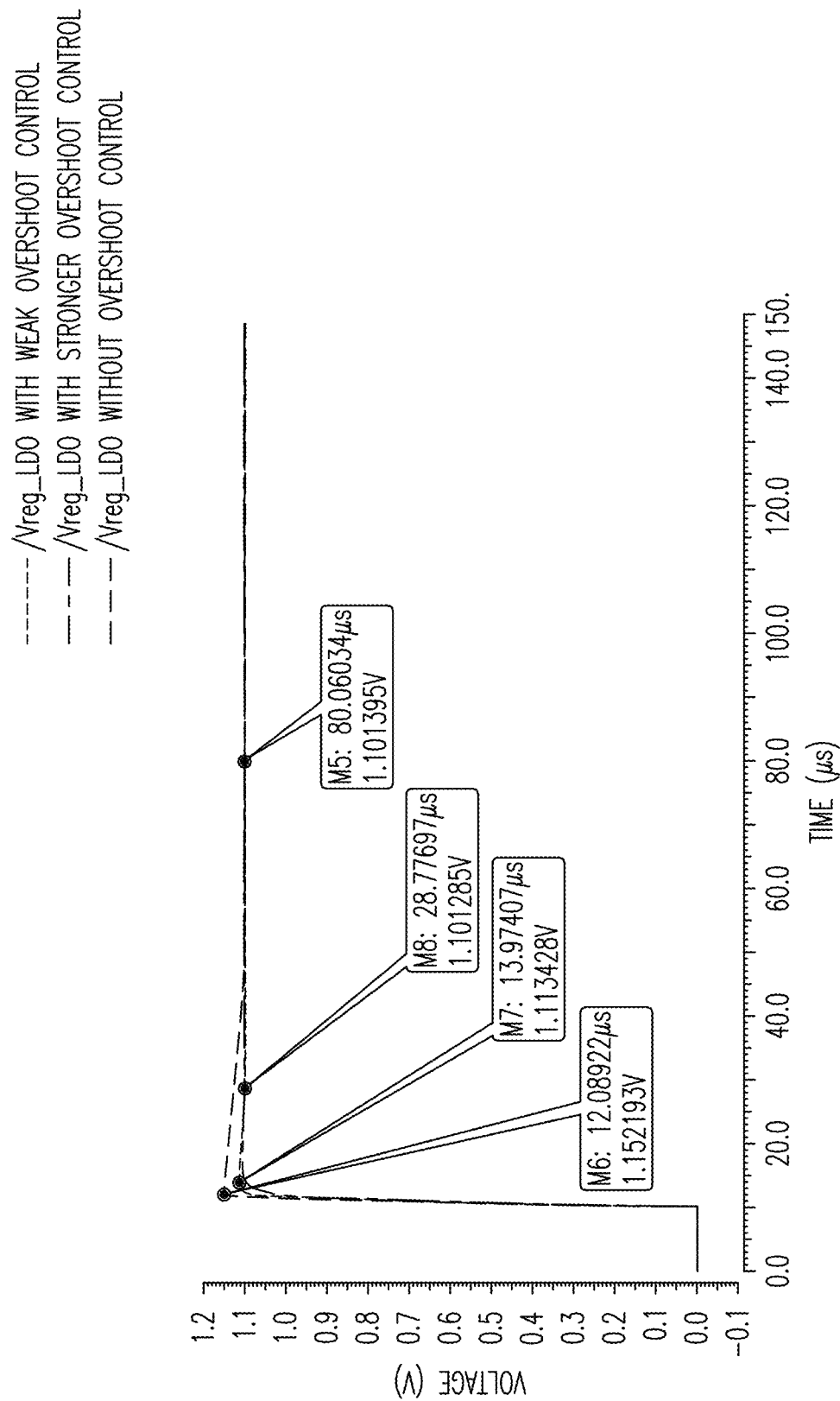
FIG. 10A is one example of a graph of programmable regulated voltage versus time with and without overshoot control.
Figure 10B:
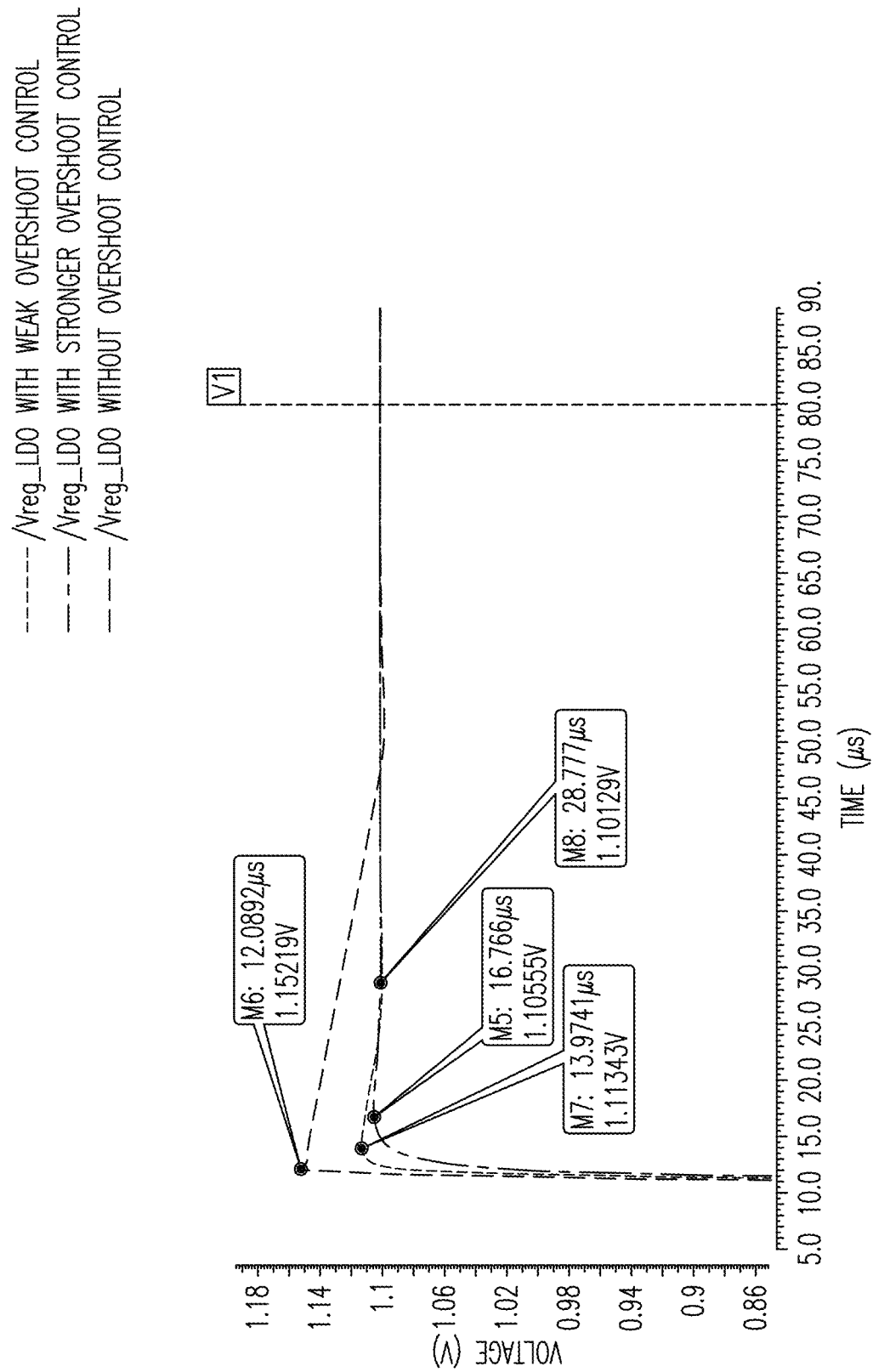
FIG. 10B is an expanded view of a portion of the graph of FIG. 10A.

FIG. 10A is one example of a graph of programmable regulated voltage versus time with and without overshoot control. Examples are shown for no overshoot control, weak overshoot control, and strong overshoot control. FIG. 10B is an expanded view of a portion of the graph of FIG. 10A showing a zoom-in on both the voltage and time axes.

Figure 11:
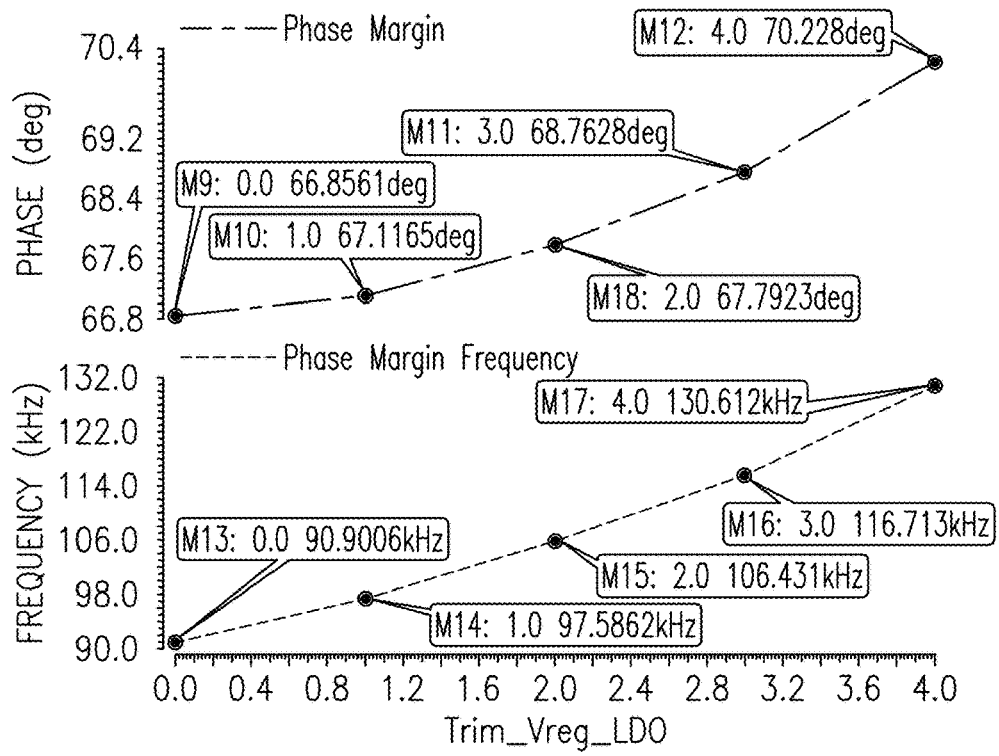
FIG. 11 is one example of a graph of phase margin for a programmable voltage regulator operating in different modes.
Figure 12:
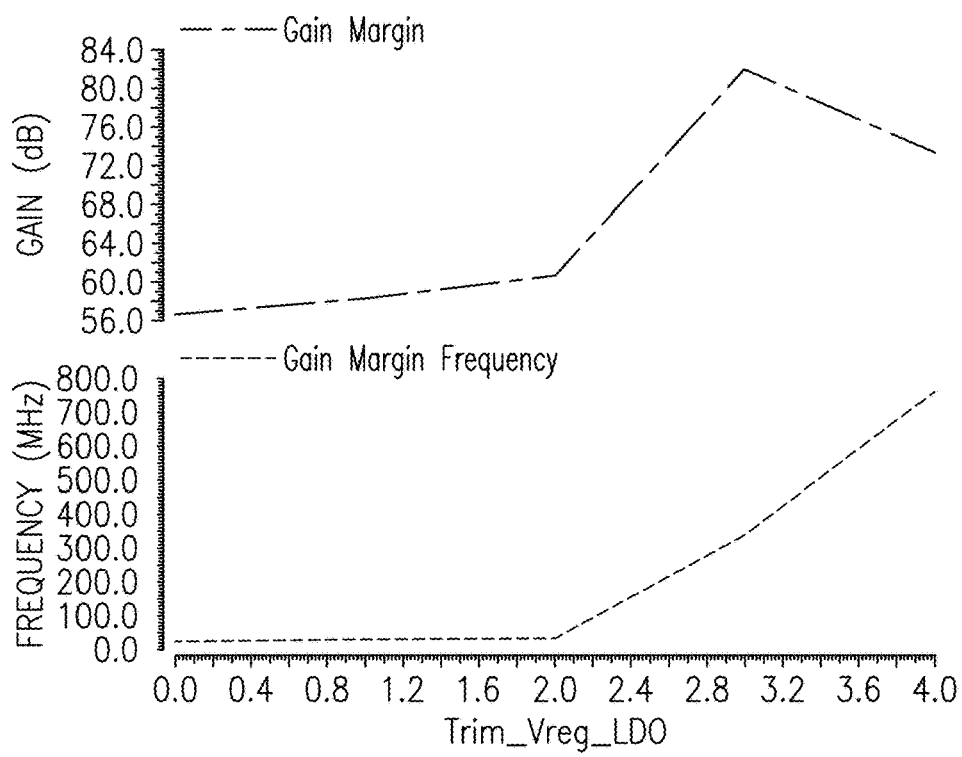
FIG. 12 is one example of a graph of gain margin for a programmable voltage regulator operating in different modes.

FIG. 11 is one example of a graph of phase margin for a programmable voltage regulator operating in different modes. FIG. 12 is one example of a graph of gain margin for a programmable voltage regulator operating in different modes.

As shown in FIGS. 11 and 12, LDO-phase margin and LDO-gain margin is maintained over process voltage and temperature (PVT) variations using selectable frequency compensation. Thus, trimming can be used to maintain stability across all modes and operating scenarios.

Figure 13:
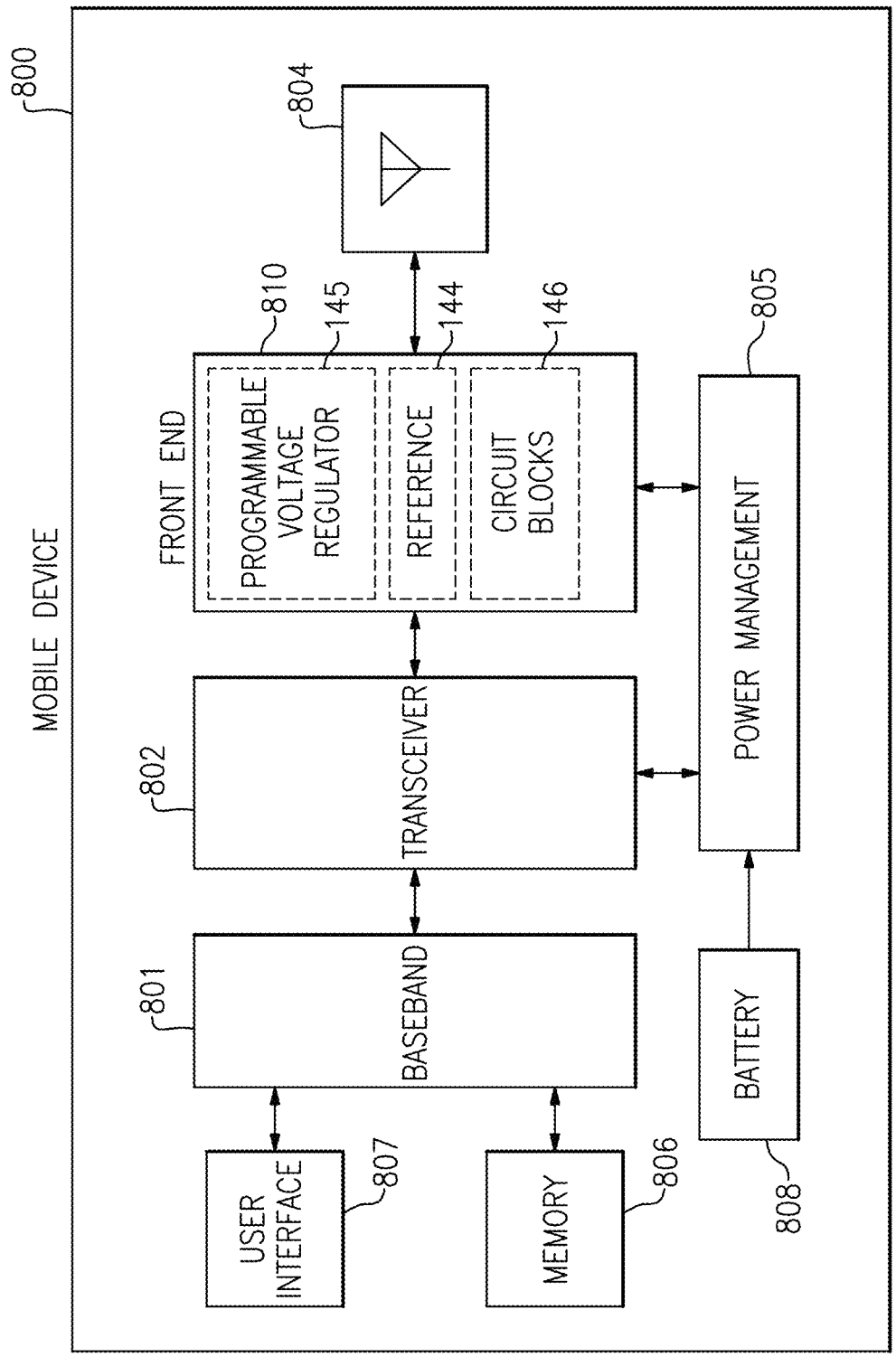
FIG. 13 is a schematic diagram of one embodiment of a mobile device.

FIG. 13 is a schematic diagram of one embodiment of a mobile device 800. The mobile device 800 includes a baseband system 801, a transceiver 802, antennas 804, a power management system 805, a memory 806, a user interface 807, a battery 808, and a front end system 810.

The mobile device 800 can be used communicate using a wide variety of communications technologies, including, but not limited to, 2G, 3G, 4G (including LTE, LTE-Advanced, and LTE-Advanced Pro), 5G NR, WLAN (for instance, WiFi), WPAN (for instance, Bluetooth and ZigBee), WMAN (for instance, WiMax), and/or GPS technologies.

The transceiver 802 generates RF signals for transmission and processes incoming RF signals received from the antennas 804. It will be understood that various functionalities associated with the transmission and receiving of RF signals can be achieved by one or more components that are collectively represented in FIG. 13 as the transceiver 802. In one example, separate components (for instance, separate circuits or dies) can be provided for handling certain types of RF signals.

The front end system 810 aids is conditioning signals transmitted to and/or received from the antennas 804. In the illustrated embodiment, the front end system 810 includes a reference voltage circuit 144, a programmable voltage regulator 145, and various circuit blocks 146. Examples of circuit blocks 146 include, but are not limited to, a digital core, an analog core, and/or RF circuitry such as amplifier biasing circuits, power amplifiers (PAs), low noise amplifiers (LNAs), filters, and/or switches. However, other implementations are possible.

For example, the front end system 810 can provide a number of functionalities, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

The mobile device system 800 illustrates one example application of the voltage regulation schemes herein. However, the teachings herein can be used in a wide variety of systems and applied to a wide variety of applications.

In certain implementations, the mobile device 800 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The antennas 804 can include antennas used for a wide variety of types of communications. For example, the antennas 804 can include antennas for transmitting and/or receiving signals associated with a wide variety of frequencies and communications standards.

In certain implementations, the antennas 804 support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

The mobile device 800 can operate with beamforming in certain implementations. For example, the front end system 810 can include amplifiers having controllable gain and phase shifters having controllable phase to provide beam formation and directivity for transmission and/or reception of signals using the antennas 804. For example, in the context of signal transmission, the amplitude and phases of the transmit signals provided to the antennas 804 are controlled such that radiated signals from the antennas 804 combine using constructive and destructive interference to generate an aggregate transmit signal exhibiting beam-like qualities with more signal strength propagating in a given direction. In the context of signal reception, the amplitude and phases are controlled such that more signal energy is received when the signal is arriving to the antennas 804 from a particular direction. In certain implementations, the antennas 804 include one or more arrays of antenna elements to enhance beamforming.

The baseband system 801 is coupled to the user interface 807 to facilitate processing of various user input and output (I/O), such as voice and data. The baseband system 801 provides the transceiver 802 with digital representations of transmit signals, which the transceiver 802 processes to generate RF signals for transmission. The baseband system 801 also processes digital representations of received signals provided by the transceiver 802. As shown in FIG. 13, the baseband system 801 is coupled to the memory 806 of facilitate operation of the mobile device 800.

The memory 806 can be used for a wide variety of purposes, such as storing data and/or instructions to facilitate the operation of the mobile device 800 and/or to provide storage of user information.

The power management system 805 provides a number of power management functions of the mobile device 800. In certain implementations, the power management system 805 includes a PA supply control circuit that controls the supply voltages of the power amplifiers in the front end system 810. For example, the power management system 805 can be configured to change the supply voltage(s) provided to one or more of the power amplifiers to improve efficiency, such as power added efficiency (PAE).

As shown in FIG. 13, the power management system 805 receives a battery voltage from the battery 808. The battery 808 can be any suitable battery for use in the mobile device 800, including, for example, a lithium-ion battery.

Figure 14A:
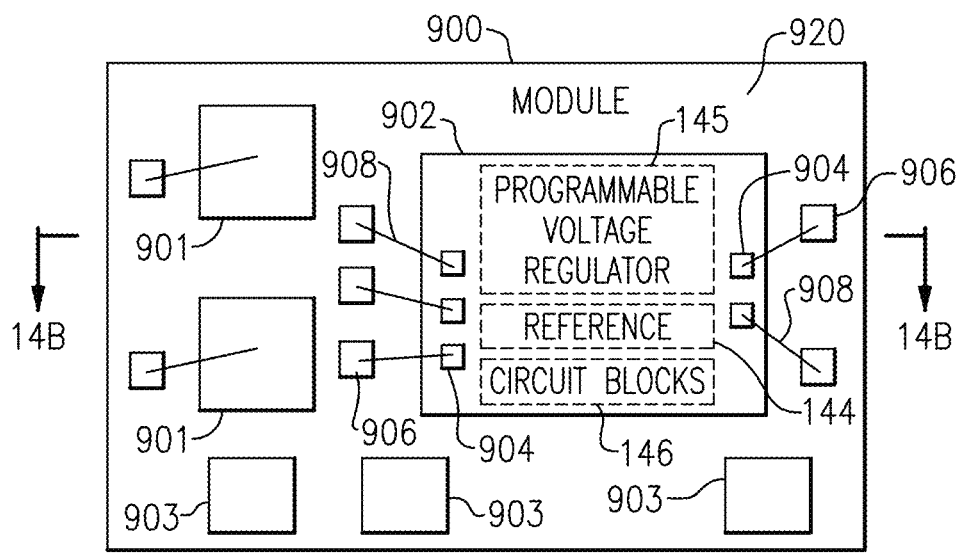
FIG. 14A is a schematic diagram of one embodiment of a packaged module.
Figure 14B:
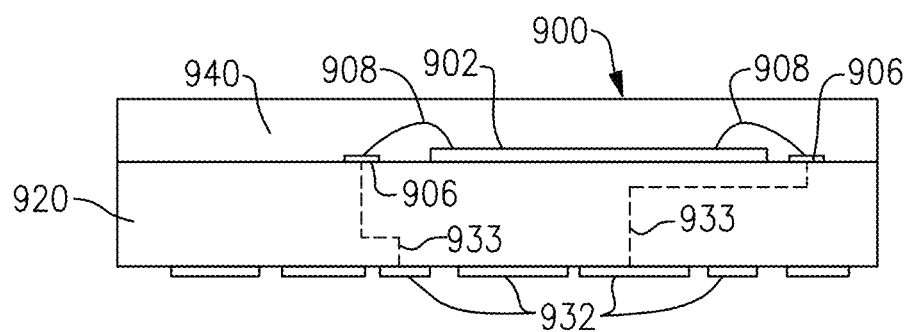
FIG. 14B is a schematic diagram of a cross-section of the packaged module of FIG. 14A taken along the lines 14B-14B.

FIG. 14A is a schematic diagram of one embodiment of a packaged module 900. FIG. 14B is a schematic diagram of a cross-section of the packaged module 900 of FIG. 14A taken along the lines 14B-14B.

The packaged module 900 includes radio frequency components 901, a semiconductor die 902, surface mount devices 903, wirebonds 908, a package substrate 920, and an encapsulation structure 940. The package substrate 920 includes pads 906 formed from conductors disposed therein. Additionally, the semiconductor die 902 includes pins or pads 904, and the wirebonds 908 have been used to connect the pads 904 of the die 902 to the pads 906 of the package substrate 920.

The semiconductor die 902 includes a reference voltage circuit 144, a programmable voltage regulator 145, and various circuit blocks 146. The semiconductor die 902 can be implemented in accordance with one or more features disclosed herein.

The packaging substrate 920 can be configured to receive a plurality of components such as radio frequency components 901, the semiconductor die 902 and the surface mount devices 903, which can include, for example, surface mount capacitors and/or inductors. In one implementation, the radio frequency components 901 include integrated passive devices (IPDs).

As shown in FIG. 14B, the packaged module 900 is shown to include a plurality of contact pads 932 disposed on the side of the packaged module 900 opposite the side used to mount the semiconductor die 902. Configuring the packaged module 900 in this manner can aid in connecting the packaged module 900 to a circuit board, such as a phone board of a mobile device. The example contact pads 932 can be configured to provide radio frequency signals, bias signals, and/or power (for example, a power supply voltage and ground) to the semiconductor die 902 and/or other components. As shown in FIG. 14B, the electrical connections between the contact pads 932 and the semiconductor die 902 can be facilitated by connections 933 through the package substrate 920. The connections 933 can represent electrical paths formed through the package substrate 920, such as connections associated with vias and conductors of a multilayer laminated package substrate.

In some embodiments, the packaged module 900 can also include one or more packaging structures to, for example, provide protection and/or facilitate handling. Such a packaging structure can include overmold or encapsulation structure 940 formed over the packaging substrate 920 and the components and die(s) disposed thereon.

It will be understood that although the packaged module 900 is described in the context of electrical connections based on wirebonds, one or more features of the present disclosure can also be implemented in other packaging configurations, including, for example, flip-chip configurations.

Applications

Some of the embodiments described above have provided in connection with mobile devices (for instance, mobile phones). However, the principles and advantages of the embodiments can be used for any other systems or apparatus that benefit from any of the circuits and systems described herein.

For example, the embodiments herein can be included in various electronic devices, including, but not limited to consumer electronic products, parts of the consumer electronic products, electronic test equipment, etc. Example electronic devices include, but are not limited to, a base station, a wireless network access point, a mobile phone (for instance, a smartphone), a tablet, a television, a computer monitor, a computer, a hand-held computer, a personal digital assistant (PDA), a microwave, a refrigerator, an automobile, a stereo system, a disc player, a digital camera, a portable memory chip, a washer, a dryer, a copier, a facsimile machine, a scanner, a multi-functional peripheral device, a wrist watch, a clock, etc. Further, the electronic devices can include unfinished products.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "may," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A front end system comprising:
    a reference voltage circuit configured to receive power from a power supply voltage and to generate a reference voltage;
    a plurality of circuit blocks each selectively enabled by a corresponding one of a plurality of enable signals, the plurality of circuit blocks including a fuse circuit, a radio frequency circuit, and a digital circuit; and
    a programmable voltage regulator configured to generate a programmable regulated voltage based on the reference voltage and to provide the programmable regulated voltage to the plurality of circuit blocks, the programmable regulated voltage having a voltage level that changes based on a selection of the circuit blocks that are enabled by the plurality of enable signals, the programmable voltage level operating at a high voltage level when the fuse circuit is enabled and at a low voltage level when the digital circuit is enabled and the fuse circuit and the radio frequency circuit are disabled.

2. The front end system of claim 1 wherein the programmable voltage level operates at a medium voltage level when the radio frequency circuit is enabled and the fuse circuit is disabled, the medium voltage level being less than the high voltage level and greater than the low voltage level.

3. The front end system of claim 1 wherein the digital circuit generates the plurality of enable signals and controls the voltage level of the programmable regulated voltage.

4. The front end system of claim 3 wherein the digital circuit generates the plurality of enable signals based on data received over an interface.

5. The front end system of claim 1 wherein the programmable voltage regulator is configured to receive power from the power supply voltage.

6. The front end system of claim 5 wherein the power supply voltage is operable at two or more voltage levels associated with two or more power supply domains.

7. The front end system of claim 1 wherein the programmable voltage regulator is a programmable low dropout regulator.

8. The front end system of claim 1 wherein the reference voltage circuit is a bandgap reference circuit.

9. A method of voltage regulation in a front end system, the method comprising:
    generating a reference voltage using a reference voltage circuit that is powered by a power supply voltage;
    selectively enabling a plurality of circuit blocks using a plurality of enable signals each corresponding to one of the plurality of circuit blocks, the plurality of circuit blocks including a fuse circuit, a radio frequency circuit, and a digital circuit;
    generating a programmable regulated voltage based on the reference voltage using a programmable voltage regulator; and
    providing the programmable regulated voltage to the plurality of circuit blocks, and setting a voltage level of the programmable regulated voltage based on a selection of the circuit blocks that are enabled, including setting the programmable voltage level to a high voltage level when the fuse circuit is enabled and to a low voltage level when the digital circuit is enabled and the fuse circuit and the radio frequency circuit are disabled.

10. The method of claim 9 further comprising setting the programmable voltage level to a medium voltage level when the radio frequency circuit is enabled and the fuse circuit is disabled, the medium voltage level being less than the high voltage level and greater than the low voltage level.

11. A mobile device comprising:
    a transceiver configured to generate a radio frequency signal;
    a power management system configured to generate a power supply voltage; and
    a front end system including a reference voltage circuit configured to receive power from the power supply voltage and to generate a reference voltage, a plurality of circuit blocks each selectively enabled by a corresponding one of a plurality of enable signals, and a programmable voltage regulator configured to generate a programmable regulated voltage based on the reference voltage and to provide the programmable regulated voltage to the plurality of circuit blocks, the plurality of circuit blocks including a radio frequency circuit configured to process the radio frequency signal and a fuse circuit, the programmable regulated voltage having a voltage level that changes based on a selection of the circuit blocks that are enabled by the plurality of enable signals, the programmable voltage level operating at a first voltage level when the fuse circuit is enabled and operating at a second voltage level less than that first voltage level when the radio frequency circuit is enabled and the fuse circuit is disabled.

12. The mobile device of claim 11 wherein the plurality of circuit blocks further include a digital circuit, the programmable voltage level operating at a third voltage level when the digital circuit is enabled and the fuse circuit and the radio frequency circuit are disabled, the third voltage level being less than the first voltage level and the second voltage level.

13. The mobile device of claim 11 wherein the programmable voltage regulator is a programmable low dropout regulator.

14. The mobile device of claim 11 wherein the digital circuit generates the plurality of enable signals and controls the voltage level of the programmable regulated voltage.

15. The mobile device of claim 14 wherein the digital circuit generates the plurality of enable signals based on data received over an interface.

16. The mobile device of claim 11 wherein the programmable voltage regulator is configured to receive power from the power supply voltage.

17. The mobile device of claim 16 wherein the power supply voltage is operable at two or more voltage levels associated with two or more power supply domains.

18. The mobile device of claim 11 wherein the reference voltage circuit is a bandgap reference circuit.

19. The method of claim 9 further comprising generating the plurality of enable signals and controlling the voltage level of the programmable regulated voltage using the digital circuit.

20. The method of claim 19 further comprising generating the plurality of enable signals based on data received over an interface using the digital circuit.

* * * * *